(12) United States Patent
Hahn et al.

(10) Patent No.: US 7,533,640 B2
(45) Date of Patent: May 19, 2009

(54) COMBUSTION ENGINE COMPRISING A CONTROL CAM

(75) Inventors: Joachim Hahn, Aachen (DE); Helge Djie, Aachen (DE); Sven Lauer, Aachen (DE); Markus Duesmann, Stolberg (DE); Falk Schneider, Munchingen (DE); Christopher Steinmetz, Ludwigsburg (DE); Hermann Hoffmann, Stuttgart (DE); Martin Lechner, Stuttgart (DE)

(73) Assignees: Fev Motorentechnik GmbH, Aachen (DE); Mahle Ventiltrieb GmbH, Stuttgart (DE)

( * ) Notice: Subject to any disclaimer, the term of this patent is extended or adjusted under 35 U.S.C. 154(b) by 128 days.

(21) Appl. No.: 10/568,214

(22) PCT Filed: Aug. 13, 2004

(86) PCT No.: PCT/EP2004/009090

§ 371 (c)(1),
(2), (4) Date: Jul. 31, 2006

(87) PCT Pub. No.: WO2005/019612

PCT Pub. Date: Mar. 3, 2005

(65) Prior Publication Data

US 2008/0115750 A1    May 22, 2008

(30) Foreign Application Priority Data

Aug. 13, 2003    (DE) ................. 103 37 430

(51) Int. Cl.
*F01L 1/34*    (2006.01)
(52) U.S. Cl. .................... 123/90.16; 123/90.17
(58) Field of Classification Search ............ 123/90.6, 123/90.16, 90.17
See application file for complete search history.

(56) References Cited

U.S. PATENT DOCUMENTS

| 3,144,009 | A |   | 8/1964 | Goodfellow et al. |
| 5,103,779 | A |   | 4/1992 | Hare, Sr. |
| 5,404,770 | A | * | 4/1995 | Kruger .................... 74/568 R |
| 5,505,168 | A |   | 4/1996 | Nagai et al. |
| 6,244,257 | B1 |  | 6/2001 | Hu |
| 6,415,752 | B1 |  | 7/2002 | Janak |
| 6,928,970 | B2 |  | 8/2005 | Sebastian et al. |

FOREIGN PATENT DOCUMENTS

| DE | 10030904 | 1/2002 |
| DE | 10038916 | 2/2002 |
| DE | 10141605 | 3/2003 |
| JP | 03202603 | 9/1991 |

* cited by examiner

*Primary Examiner*—Zelalem Eshete
(74) *Attorney, Agent, or Firm*—Gifford, Krass, Sprinkle, Anderson & Citkowski, P.C.

(57) ABSTRACT

The invention relates to a contoured body having an additional cam contour for effecting a valve control of a piston combustion engine that is used, in particular, for an internal exhaust gas recirculation.

22 Claims, 13 Drawing Sheets

Figure 1:
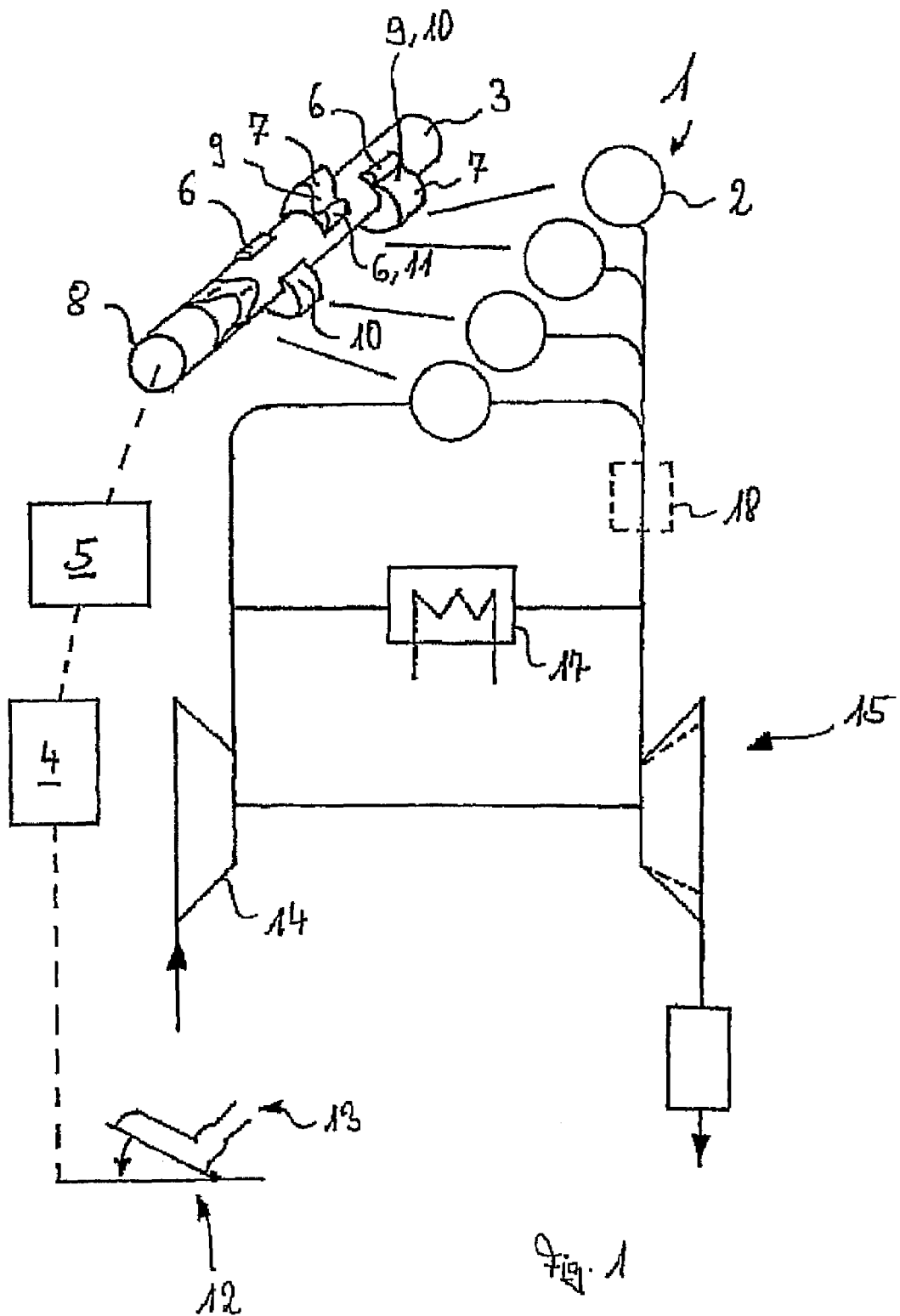

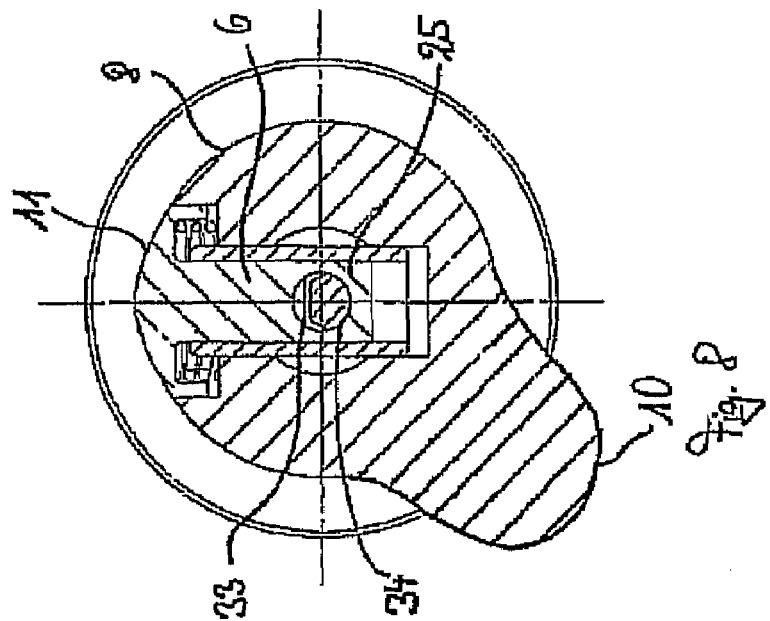
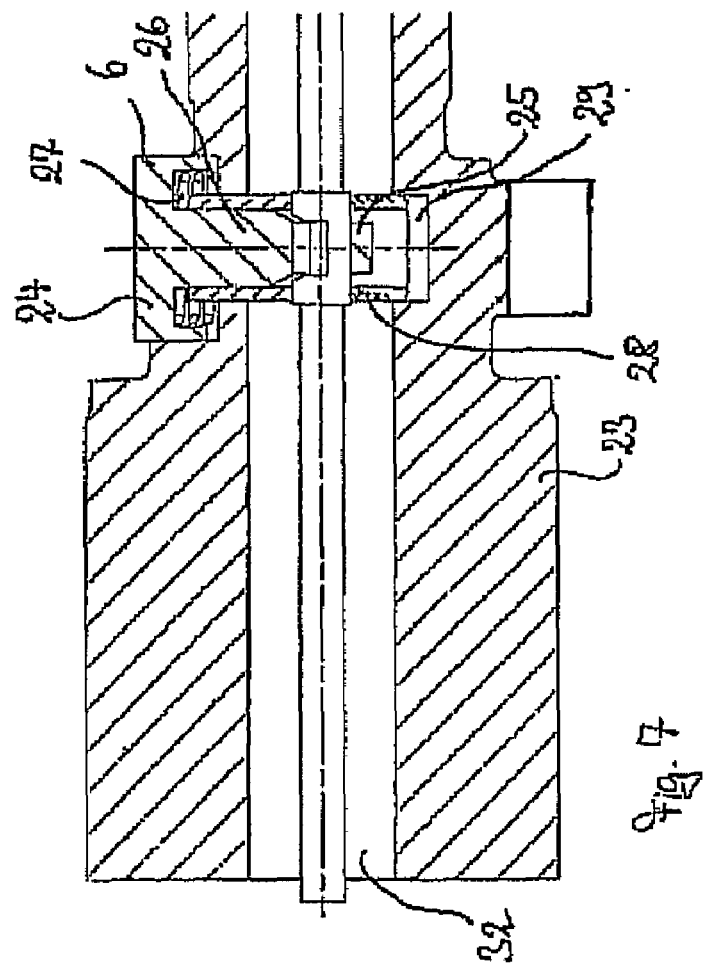

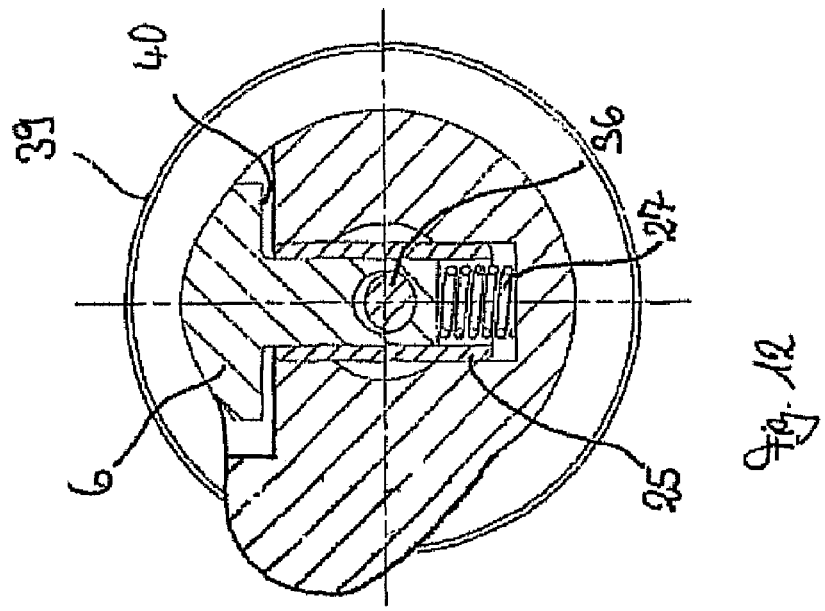
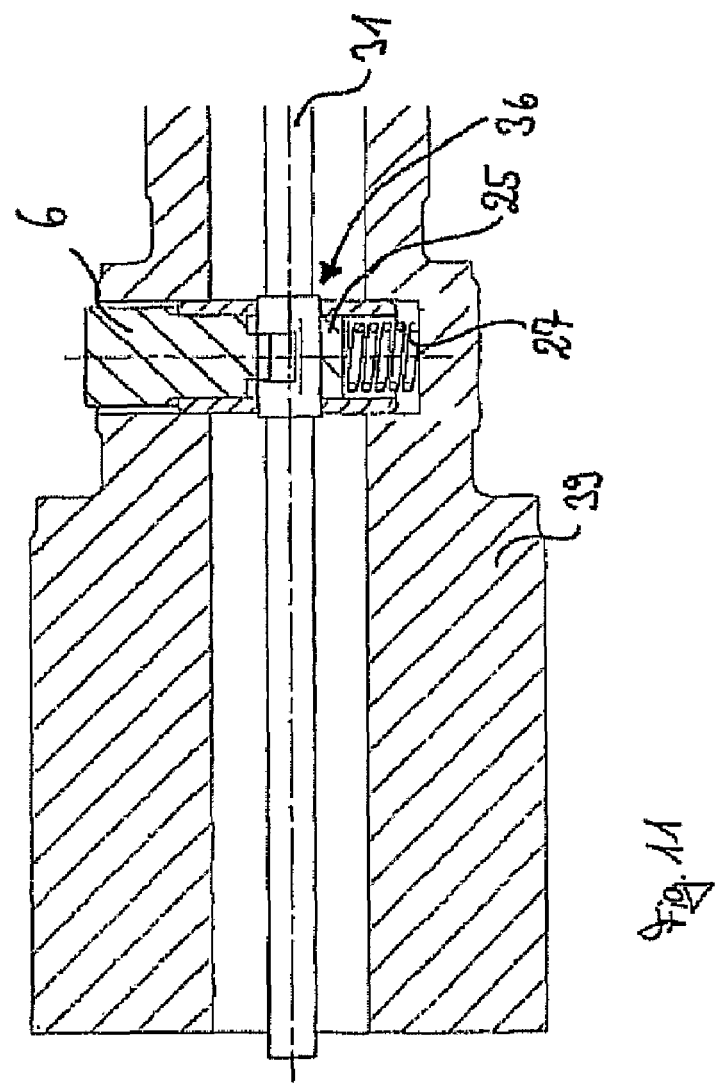

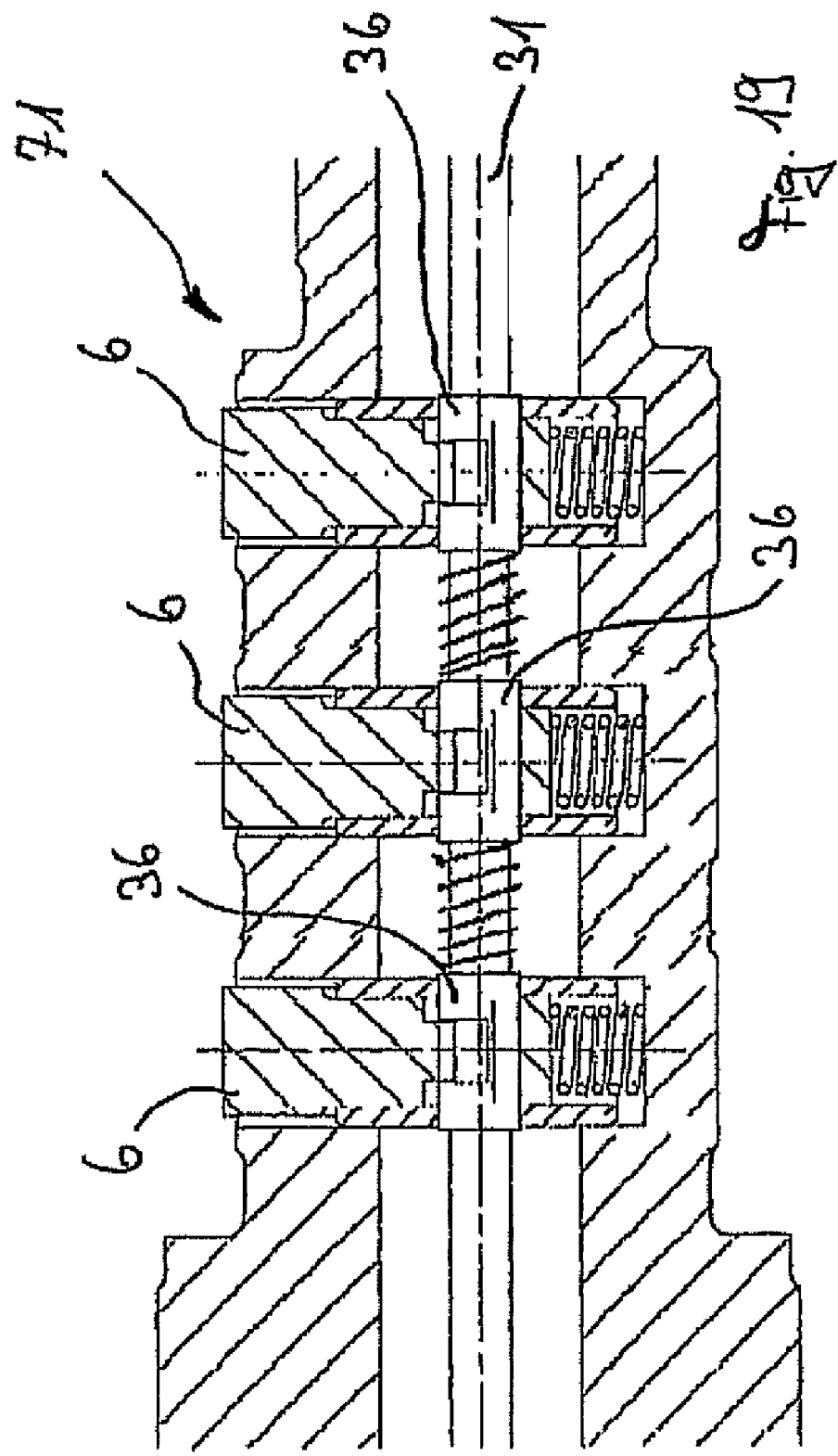

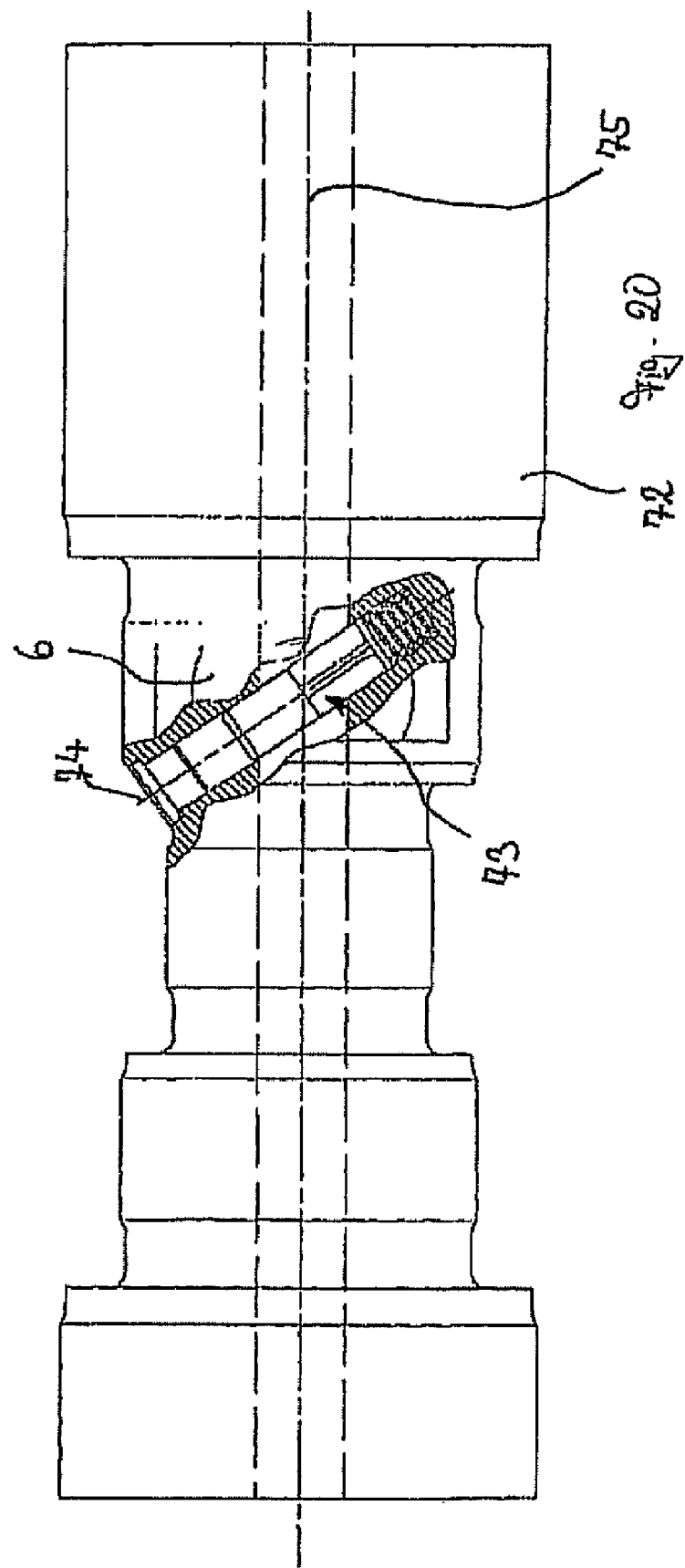

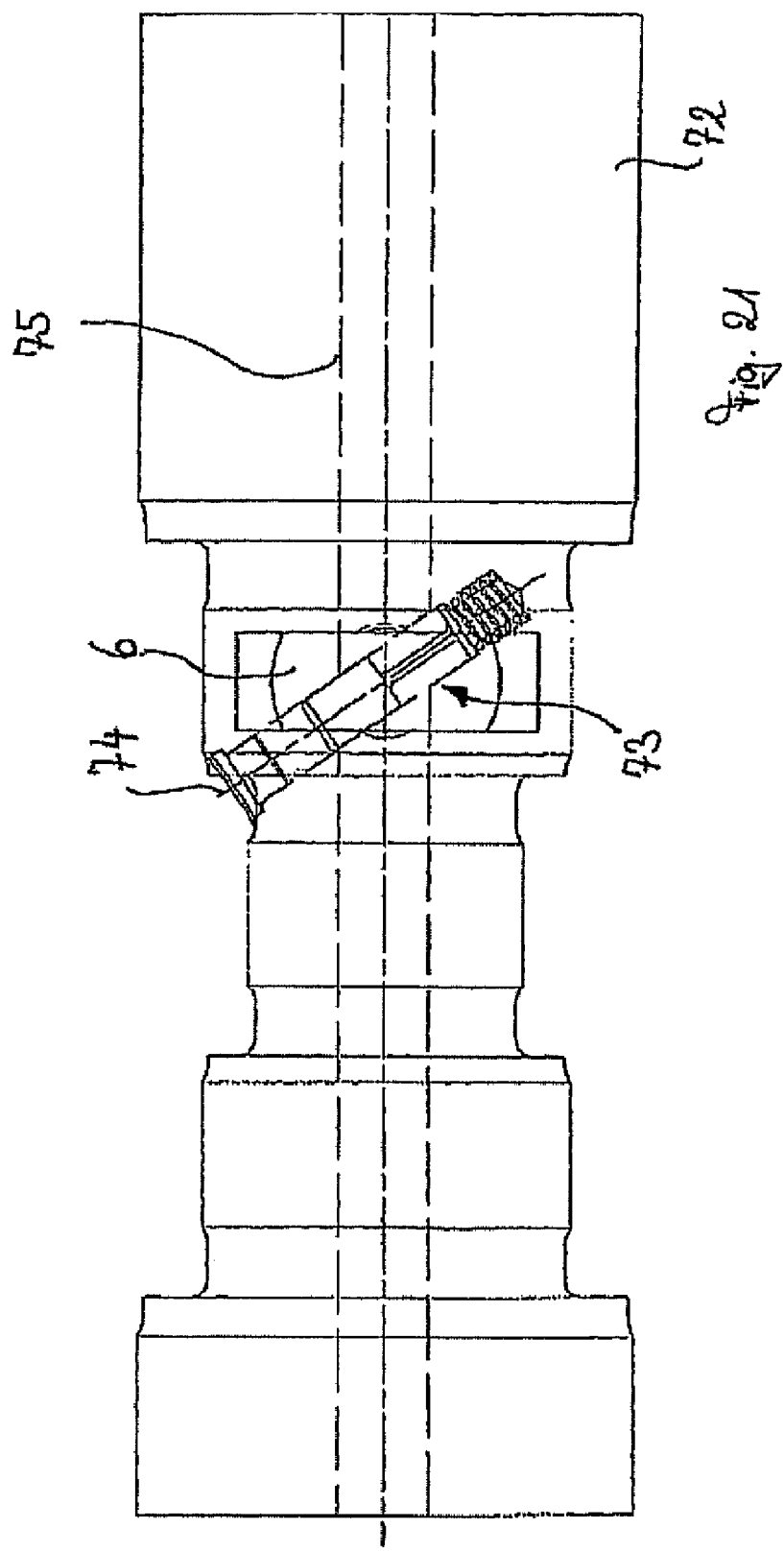

COMBUSTION ENGINE COMPRISING A CONTROL CAM

The invention under consideration concerns a piston combustion engine with gas inlet valves and gas outlet valves, which can be actuated via at least one camshaft.

From DE 100 38 916 A1, providing a piston combustion engine with gas inlet and gas outlet valves, which can be actuated via camshafts, is known. In addition to a main cam, at least another secondary cam is placed on the camshaft. This secondary cam is formed by a contoured body, which has a cam contour. The contoured body is placed in the camshaft in a movable manner, wherein it can be displaced between an activated and an inactivated position. For example, in an activated position, it is locked with the camshaft or it swivels in an activatable position. With the aid of the contoured body, a switching is to be made possible, which exerts a braking effect with the actuation of the contoured body via a corresponding valve control.

The goal of the invention under consideration is to provide an improvement of a camshaft with at least one contoured body, proceeding from this state of the art, by means of which, in particular, a more reliable operation and a versatile usefulness of the piston combustion engine is made possible.

This goal is attained with a piston combustion engine with the features of Claims 1, 5, 10, 11, and 17. Other advantageous developments and refinements are indicated in the individual dependent claims.

A piston combustion engine with gas inlet valves and gas outlet vales has at least one camshaft, via which the valves can be actuated. The camshaft has at least one cam as control contour. The cam has a base circle contour with a cam contour protruding radially beyond the base circle contour. A contoured body with an additional cam structure has a position at rest, which is simultaneously its active position, wherein the contoured body, supported in a permanently yielding manner in its position at rest, protrudes beyond the base circle contour and when a power transmission element passes over it, is pressed radially into its base circle contour and the permanent flexibility is blocked in its active position. Preferably, the contoured body is completely pressed in radially. The power transmission element, is for example, a roller, which is suspended on a valve drive.

A refinement provided for the contoured body makes possible, in its position at rest, an internal exhaust gas recirculation. Preferably, this is regulated via an engine control, which, for a corresponding activation, receives and evaluates measurement and operating data, not only from the combustion engine, but also from the exhaust gas unit.

Furthermore, an adjustment device is provided, by means of which a contoured body, which can be brought to on active position and which has an additional cam contour, which is located in a flank of the cam contour, can be displaced. This permits, in particular, for the possibility of an overlapping of valve opening and closing times for the gas inlet and gas outlet valves. Such an overlapping can be adjusted by means of the additional cam contour. Furthermore, the additional cam contour makes possible the undertaking of a corresponding activation only if it provides, for example, an engine regulation. For example, this can be used for an internal exhaust gas recirculation and/or for a braking effect, which is triggered, for example, by working together with an engine brake.

Preferably, the additional cam contour projects over the flank of the cam contour only in the active position. If the additional cam contour is not in its active position, it preferably makes possible an approximately flush closure relative to the rest of the camshaft contour. In accordance with a refinement, provision is made so that the additional cam contour and thus the contoured body can be brought into an active position in a defined adjustable manner. Depending on the desired actuation of the corresponding valve, the contoured body can move into its end position of the active position and also into an intermediate position and remain there. This makes possible a variable opening of the valve to be controlled. For example, in this way, a valve can be opened or closed only to a small degree. In particular, this makes it possible for the gas inlet and gas outlet valves to be differently controlled. This is, for example, possible for the gas inlet and for the gas outlet valve by means of different camshafts. Also, by means of a single camshaft but different actuatable contoured bodies for gas inlet and gas outlet valves, a change of the gas alternation can take place.

In accordance with another development, provision is made so that the additional cam contour projects, in its position at rest, beyond the flank of the cam contour. This makes possible a permanent control of the valves. This can, for example, be provided if the piston combustion engine is mainly operated in certain load ranges. Preferably, this is carried out with stationary motors.

In accordance with another development, the camshaft has an arrangement in which the additional cam contour is located at least in the immediate vicinity of a transition of the cam contour to the base circle contour of the cam. In this way, for example, an overlapping of the opening of the gas inlet and gas outlet valve is made possible, wherein, for example, a back flow of exhaust gas into the cylinder can be made possible or exhaust gas is expelled into the suction system, which can subsequently, once more, be suctioned into the cylinder.

In accordance with another idea of the invention, a piston combustion engine with gas inlet and gas outlet valves is provided, which can be activated via at least one camshaft. A cam has, as a control contour, a base circle contour and a cam contour that projects radially beyond the base circle contour. By means of an adjustment device, a contoured body located in the camshaft and with an additional cam contour can be brought to an active position, wherein the adjustment device exerts a force in the direction of the active position of the contoured body, which can be changed by adjustment. This makes possible, in particular in an adaptation to the pertinent operating conditions of the piston combustion engine and in particular in view of the load conditions prevailing at the moment, the exertion of different forces on the contoured body. In particular, this ensures a locking of the contoured body in its active position. In this way, for example, the adjustment device makes possible different active positions of the contour body. Also, the application of the force in the direction of the active position of the contoured body, makes possible the securing of the contoured body during operation. In particular, this exerted force can also support—in particular, bring about—an adjustment of the contoured body from one active position to the next active position.

Preferably, the adjustment device has a hydraulic device to produce a force. By means of the hydraulic device, which, for example, is operated via an oil pump located in the motor vehicle, such a force is brought about that in this way, for example, a securing of the position of the contoured body takes place. As long as a counterforce acts on it, which, for example, does not exceed a limiting force, the additional body remains in its active position. If a limiting force is exceeded, then the additional body can be pressed against the acting hydraulic force, once again, into the camshaft. In this way, any damage arising due to the additional body, for example on the valve drive of the piston combustion engine, is avoided.

Preferably, the adjusting device also has a spring. By means of the spring, a basic force can be applied on the contoured body. This basic force makes possible, in particular, for the contoured body to be pressed again and again into a position at rest by rotating the camshaft by means of a corresponding valve drive element, such as a tappet and/or a tapping roller. Only when the hydraulic device exerts such a pressure on the contoured body that it remains in the active position, does the contoured body act on the valve drive element.

In accordance with a refinement, provision is made so that a force, which is applied by means of the adjusting device on the contoured body, is supported via a hydraulic cushion. Preferably, the hydraulic cushion is uncoupled from the oil pressure in the camshaft by a rotatable inside tube and maintained. By additional rotation, it is possible to become coupled, once again, to the oil pressure. By means of, for example, an integrated check valve, a refilling of leakage loss is permitted. In this way, an end coupling and coupling of the hydraulic cushion to the oil supply can take place.

Another development provides for the application of a force on the contoured body by means of hydraulics and its support in the coupled state of the hydraulic cushion. In a switched-off state of the hydraulic element, the pressure drops, so that the contoured body is now supported only by means of a "lost-motion spring." An additional support by means of oil pumped back and forth does not occur. Preferably, an oil pressure on the order of magnitude between 100 and 120 bar is used, since in this way a sufficient position securing with respect to the counterforces generated is present. For example, this pressure can be produced by means of a piston pump with a piston diameter of 20 mm.

In accordance with another idea of the invention, a piston combustion machine with gas inlet and gas outlet values is provided, which are actuatable via at least one camshaft, wherein a cam has, as a control contour, a base circle contour and a cam contour projecting radially beyond the base circle contour, and a contoured body, which can be brought to an active position by means of an adjusting device and with an additional cam contour, is located in the camshaft. A contoured body guide is located in an eccentric position relative to the camshaft center and/or to a valve transmission device. In this way, it is possible for the applied forces to lead to transferrable torques. In particular, it makes possible, with respect to the contoured body, an improved force flow direction in it. This is designed, in particular, in such a way that an actuation of a valve tappet, as a part of the valve transmission device, takes place, for example, by the reduction of disturbing transverse forces.

In accordance with another idea of the invention, a piston combustion engine with gas inlet and gas outlet valves is provided, which are actuatable via at least one camshaft, wherein a cam has, as a control contour, a base circle contour and a cam contour projecting radially beyond the base circle contour, and a contoured body, which can be brought to an active position by means of an adjusting device and with an additional cam contour, is located in the camshaft. The adjusting device has a mechanical coupling element for the activation and fixing of a contoured body, which element is in connection with the contoured body, which can be moved in a radial direction along a straight line. This permits, in particular, the possibility of using the mechanical coupling element for the securing of the contoured body and thus for the adjustment of the additional cam contour in the camshaft. For example, the contoured body in its position at rest also simultaneously assumes its active position.

Preferably, for example a coupling element is used, which has a coupling bolt. By means of this coupling bolt, it is possible to transfer a mechanical force to the contoured body. In particular, the coupling bolt can be used as a support for the contoured body. In accordance with one development, the mechanical coupling element, for example, the coupling bolt, has a slope. The contoured body in the camshaft can be moved via this slope and at the same time can also be supported. In accordance with another development, the mechanical coupling element for example, the coupling bolt, has a stepped segment. This makes possible, in particular, for several steps to be placed adjacent to one another, which, in turn, make possible, in their totality, an adjustment possibility of the contoured body. The contoured body can also be supported directly on the steps. Another development provides for the mechanical coupling element, for example, the coupling bolt, to be constructed as a toggle lever. This makes possible, on the one hand, a securing of the contoured body in its individual position. On the other hand, a displacing of another component, which brings about a movement of a part of the toggle lever, makes possible the activation of the toggle lever and thus the activation of the contoured body into a position in which the additional cam contour projects beyond the base circle contour. Another refinement provides for tile construction of the coupling bolt as a displaceable punch. This has, in particular, the advantage that one or more edge carriers can be avoided, which would otherwise possibly be needed during a switching process. The word "edge carrier" thereby designates the insufficient overlapping between the contoured body and coupling element with the consequence of inadmissible surface compressions.

In accordance with another idea of the invention, at least one spherical bulged configuration is provided for, in particular, to avoid one or more edge carriers between the camshaft and a tappet or a tapping roller of the valve transmission device. For example, the tappet can be provided with a unilateral bulged disk. In accordance with another development, the cam and the additional cam contour are constructed, in particular, ground, so that they are sloped in opposite directions, with a bulged tappet surface. In this way, a guide is made possible, which avoids a contact of the tappet with the edge of the additional cam and thus an exceeding of admissible compressions.

In accordance with another idea of the invention, provision is made so that the camshaft has several additional cam contours on contoured bodies, which are adjustable via several coupling elements. The coupling elements are mutually in coupled connection so as to transfer a joint activation and a preferable fixing of the contoured bodies. In particular, the coupled connection is constructed via a mechanical coupling of coupling bolts in the camshaft. Such a connection is produced, for example, by springs. They can be torsion springs or axially acting springs. They are connected with one another via the coupling bolts. By actuating a first coupling bolt, all others are also actuated, for example, simultaneously or successively, because of the mechanical coupling. An actuation can make provision, for example, so that the coupling bolts assume a certain position which is defined axially and also radially. Preferably, the coupling bolts mesh into a certain fit, wherein the contoured body can be coupled, in particular, in a force-fee state. In a coupled state, the coupling bolts bring about, in turn, a securing of the position of the contoured bodies. In the same way, it is possible to uncouple, at the same time, several contoured bodies. Another development provides for not coupling all coupling bolts with one another.

Rather, only special coupling bolts are coupled with one another. In this way, the possibility exists of providing for a first and a second number of piston bolts coupled with one another, which can be activated, independently of one another.

In accordance with a refinement, provision is made so that the contoured body runs in a guide, which is preferably used, at the same time, as a guide for coupling elements, such as springs or something similar. This permits making available sufficient room with, for example, a single borehole in the camshaft, in which all movable parts run.

Another development provides for an axis of the coupling elements, such as a spring, to be placed at an angle to a camshaft axis. This permits a force transfer by utilization of a larger adjusting path, in comparison to a device situated in an exclusively radial manner.

Preferably, the piston combustion engine is integrated into a regulation concept for internal exhaust gas recirculation, in accordance with at least one of the ideas and refinements described above. For example, a method for the internal exhaust gas recirculation in a piston combustion engine can be provided, in which an outlet valve is opened during the suctioning of fresh gas from an inlet channel into a cylinder, in order to suction additional exhaust gas from an outlet channel, and/or an inlet valve is opened during the expelling of exhaust gas from the cylinder into the outlet channel, in order to expel a part of the exhaust gas into the inlet channel. For example, a decoupling of the load change from an internal exhaust gas recirculation can be provided. This permits the possibility of coordinating both the load change and the internal exhaust gas recirculation with the individual requirements, independent of one another.

In particular, an opening or closing of the inlet or outlet valve can be maintained variably. To this end, the valve drive has a corresponding adjusting possibility, which functions, for example, in an interplay with the camshaft. Preferably, an actuation of the contoured body is also initiated via a characteristic diagram control. This permits, for example, the possibility of an operating state-dependent valve management with a control decoupled from the camshaft. This valve management can be examined for the individual operating state and adapted by means of a characteristic diagram-stored parameter examination.

In accordance with another development, provision is made so that the piston combustion engine is used in the braking of an engine. Preferably, the contoured body for the actuation of an exhaust gas valve can be activated for an engine braking. For example, the contoured body is brought to an active position by a corresponding control of the adjusting device. In this way, an outlet valve can be turned off, which brings about, in this way, an engine braking function. For example, the outlet valve is opened briefly during a compression, in order to decompress the cylinder in a controlled manner and, in this way, to brake the combustion engine. The desired braking effect can be adjusted, for example, by a coordination of the opening and closing time and a stroke of the outlet valve, which can be preferably adjusted, independent of an actuation of the load change valves. In particular, by using a mechanical coupling and fixing of the contoured bodies, a high force transfer is guaranteed, as is necessary, for example, for a braking effect via the outlet valve. The outlet valve must be opened against the high cylinder internal pressure during compression. The correspondingly high pressure is reliably transferred by the mechanical coupling of the valve up to the contoured body.

In accordance with another idea of the invention, a piston combustion engine with gas inlet and gas outlet valves is made available; the valves are actuatable via at least one camshaft, wherein the individual cams have, as a control contour, a base circle contour and a cam contour, which projects beyond the base circle contour, and wherein for at least some of the valves, preferably, gas outlet valves, a contoured body with at least one additional cam contour is located on the correlated cams, and this contoured body can be brought to an active position, which projects beyond the base circle contour of the cam. The additional contoured body is in the form of a mushroom, with an elongated eccentric cam and a guide body, which is preferably constructed cylindrically, wherein the elongated eccentric cam is unilaterally guided in a groove transverse to the camshaft axis in the base circle profile and/or cam profile of the camshaft in the form of a rotational securing element and the cylindrical guide body, which lies inward radially in a guide, preferably a guide borehole, is conducted in the camshaft, and the additional contoured body can be displaced radially. Preferably, the contoured body can be brought to the active position or can be locked in it by means of the adjusting device.

The contoured body in the form of a mushroom has, in particular, an eccentric cam, which is shaped at least like a roof, and has a guide body, on which the eccentric cam can be supported and in particular, a movement is transferrable. For example, the eccentric cam or the guide body can consist of several components, which permit a relative movement among one another. The eccentric cam or the guide body can have a definite length and can also be changeable in its length. Preferably, the eccentric cam projects beyond the guide body at least partially or covers it.

In accordance with a refinement of the piston combustion engine, the diameter of the cylindrical guide body is larger than the width of the elongated eccentric cam.

Preferably, the additional contoured body is placed eccentrically in the camshaft longitudinal axis. In particular, the additional contoured body can be placed eccentrically, relative to the individual cam. A refinement provides for the individual cam and/or the additional contoured body to be placed eccentrically relative to the individual cam successor.

With a bulgedly constructed cam successor, the pertinent cam and/or the additional contoured body to avoid edge carriers is specially constructed, preferably inclined, bulgedly, spherically, or spatially formed.

Another development provides for the eccentric placement of the elongated eccentric cam and/or the guide body, relative to the camshaft longitudinal axis.

Preferably, the radial extension movement of the additional contoured body is limited by a mechanical stop in the adjusting direction or in the system.

In accordance with another refinement, provision is made so that between the additional contoured body and the camshaft, a force, preferably, an elastic force acts, which in the deactivated state always keeps the additional contoured body in contact with the stop in the extended position or in contact with the cam successor.

Provision is made, for example, so that the adjusting device is formed by a mechanical supporting device, which is actuated via an actuation element. The adjusting device can have a slide rod or a rotating rod, on which an adjusting element is located for any contoured body to be controlled. Adjusting elements on the adjusting device can be arranged indirectly over storage elements, preferably springs, so that when activated or turned off via the adjusting device, each adjusting element can be connected automatically at different points in time. The adjusting element and the contact area in the guide body are preferably constructed with the adjusting element at an incline or in stepped form. The adjusting element and the contact area in the guide body with the adjusting element are, according to another refinement, constructed in the form of two opposed combs, so as to guarantee a large overlapping area for the fixing of the additional contoured body with a slight movement of the adjusting device.

Furthermore, a guide sleeve connected in a fixed manner with the camshaft can be located between the cylindrical guide body and the camshaft. The guide sleeve comprises, for example, the storage functions for the individual adjusting element.

Another development provides for the adjusting device to consist of mechanical adjusting elements and a hydraulic control. The mechanical adjusting elements are located, for example, in the camshaft longitudinal axis and can be displaced in it hydraulically and with elastic force.

The mechanical adjusting elements can also be located in a direction that differs from the camshaft longitudinal axis, which is vertical to the direction of movement of the additional contoured body, and are hydraulically displaceable with elastic force.

Preferably, provision is made for the placement of a borehole for the mechanical adjusting elements at an incline next to the cams located on the camshaft. For example, the borehole for the adjusting elements is placed radially through the base circle of the individual cam of the camshaft.

The adjusting element can also be constructed in the form of a toggle lever and thus, an automatic locking is possible.

Also, the adjusting device or the adjusting elements can be constructed with the function of the mechanics of a ballpoint pen—that is, with a one-time actuation, the automatic fixing of the additional contour in the extended position is carried out; with the next actuation, the automatic turning off of the additional contour takes place.

Furthermore, provision is made so that the adjusting device is formed by a hydraulic supporting device, which can be actuated by actuation elements. Also, a control element, preferably a tube, can be situated in the camshaft so that a hydraulic adjusting element is located between the cylindrical guide body of the additional contoured body and the camshaft, so that the hydraulic adjusting element functions in the form of a hydraulic compensation for play and in addition, is designed so it can be switched on and off via the control element. Another development provides for boreholes to be located in the control element, which by displacement or rotation, open or close the pressure chamber of the adjusting elements.

A refinement provides for the functions of a compensation for play with a precontrolled check valve to be located between the cylindrical guide body of the additional contoured body and the camshaft in such a way that with a lack of oil pressure or with low oil pressure, a compensation is not possible, and with oil pressure or oil pressure above a defined switching pressure, compensation take place and thus the additional contoured body moves to the active position and is fixed.

Preferably, an additional supporting element is located between the cylindrical guide body and the piston for the compensation for play in such a way that in the active state, the supporting element with the additional contoured body is extended via the compensation for play to the stop and therefore the supporting element can fit tightly on the guide body free from play, and in the deactivated state, the force located between the additional contoured body and the supporting element, preferably a spring, brings the supporting element to the block—that is, to the radially interior end position of the compensation for play—and the force acting on the additional contoured body ensures contact to the cam successor or stop, without the compensation for play cyclically changing the volume.

The cylindrical guide body of the additional cam contour is, for example, guided via the supporting element and an outside guide sleeve, in the camshaft.

In accordance with another development, provision is made so that the outside guide sleeve, as an installation unit, in addition to the supporting element and the guide element of the additional contoured body, also comprises hydraulic components, such as the check valve and the precontrol piston with the precontrol spring and/or the stop for the movement of the additional cam contour. For example, this installation unit is pressed on positions into the camshaft, wherein additional adjusting activities are not necessary.

Provision can also be made so that the additional stroke function of the actively controlled contoured body brings about at least one valve movement in the base circle area of the base cam. The additional stroke function of the actively controlled contoured body brings about, for example, a changed closing or opening movement—that is, changed stroke function in the area flank and base circle or base circle and flank of the base movement. The stroke profile of the controlled contoured body can have a profile different from the base circle of the base cam, either at the beginning or at the end of the effective area, so as to improve the transition between the flank and the additional profile. Preferably, the additional stroke function of the actively controlled contoured body brings about a partially changed valve movement of the base valve stroke.

For example, the stroke function switch by means of the additional contoured body is used for the torsion and/or tumble switch. The stroke function switch by means of the additional contoured body can also be used as the engine brake. Furthermore, the possibility exists of using the stroke function switch by means of the additional contoured body for the internal exhaust gas recirculation. A refinement provides for the stroke function switch by means of the additional contoured body to be used to improve the loading by gas dynamics.

Another development provides for the cam successor to be constructed with a contact body that moves at least in the camshaft longitudinal axis to improve the camshaft-cam successor contact. For example, the movable contact body on the can successor is formed as an elephant foot.

Figure 2:
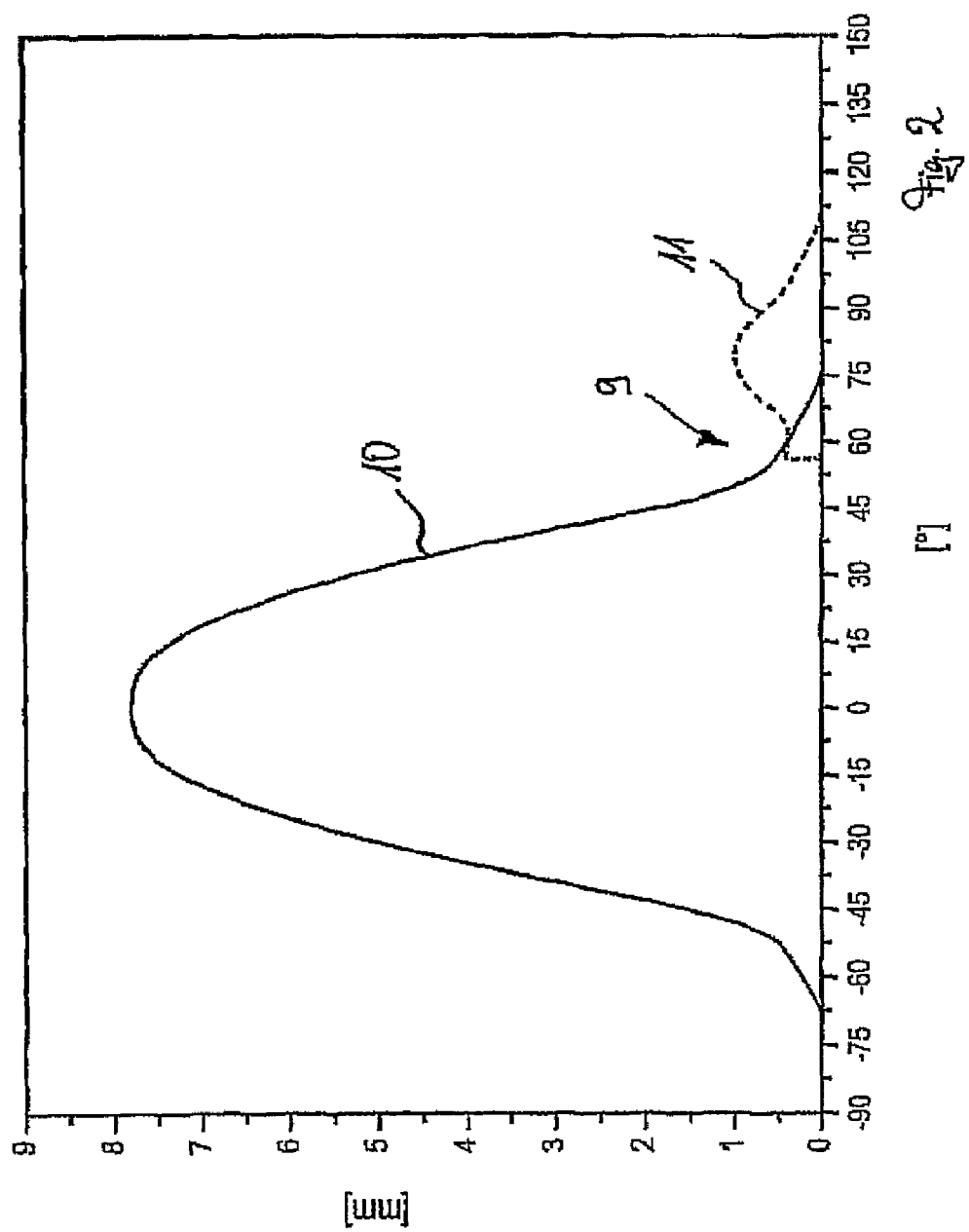
Figure 3:
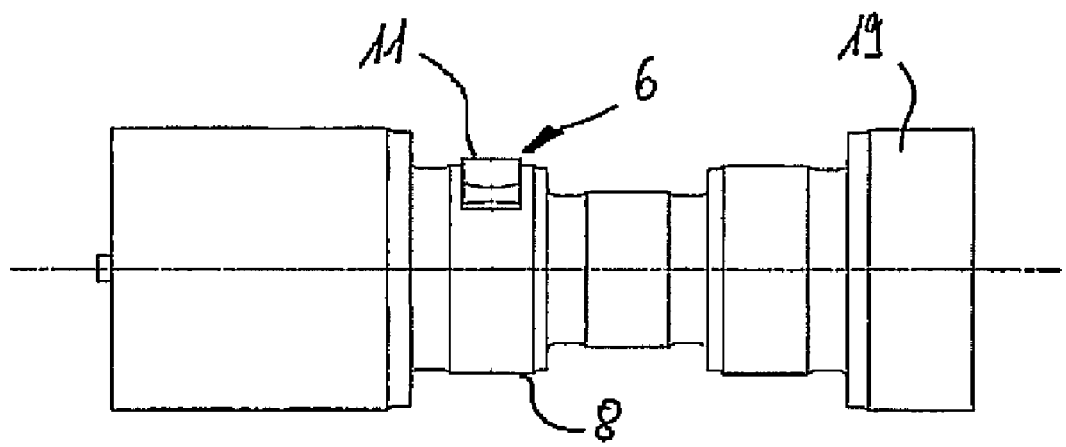
Figure 4:
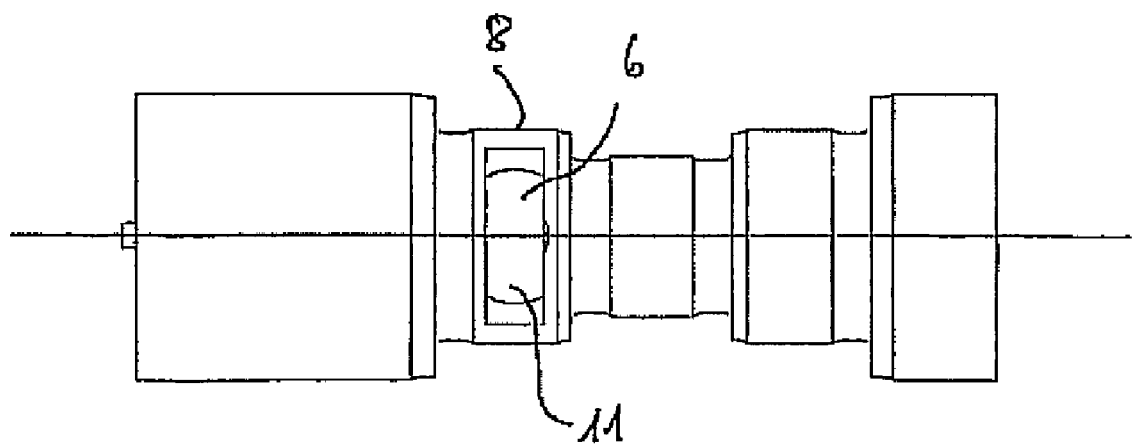
Figure 5:
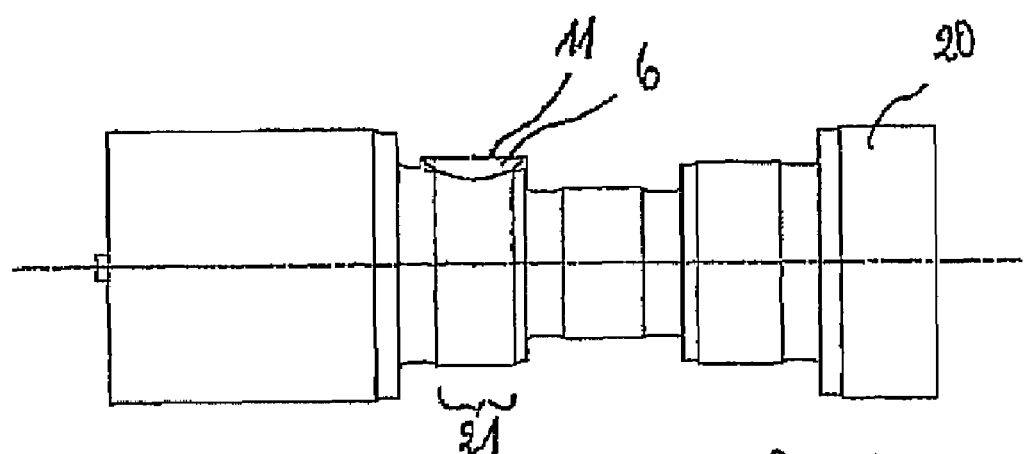
Figure 6:
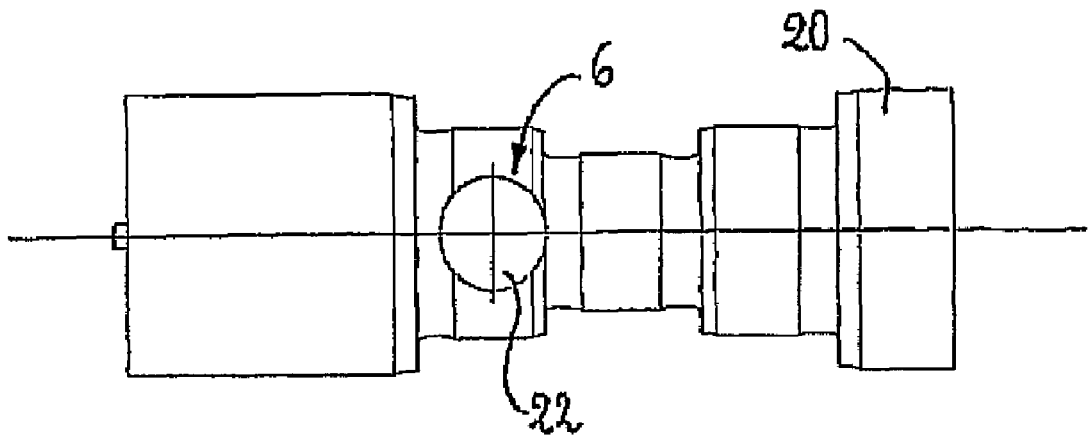
Figure 10:
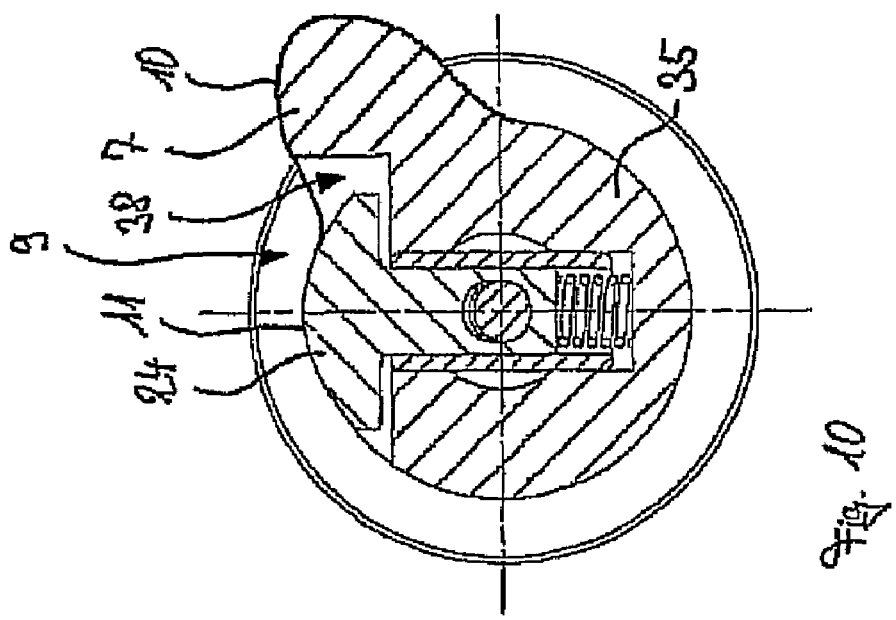
Figure 9:
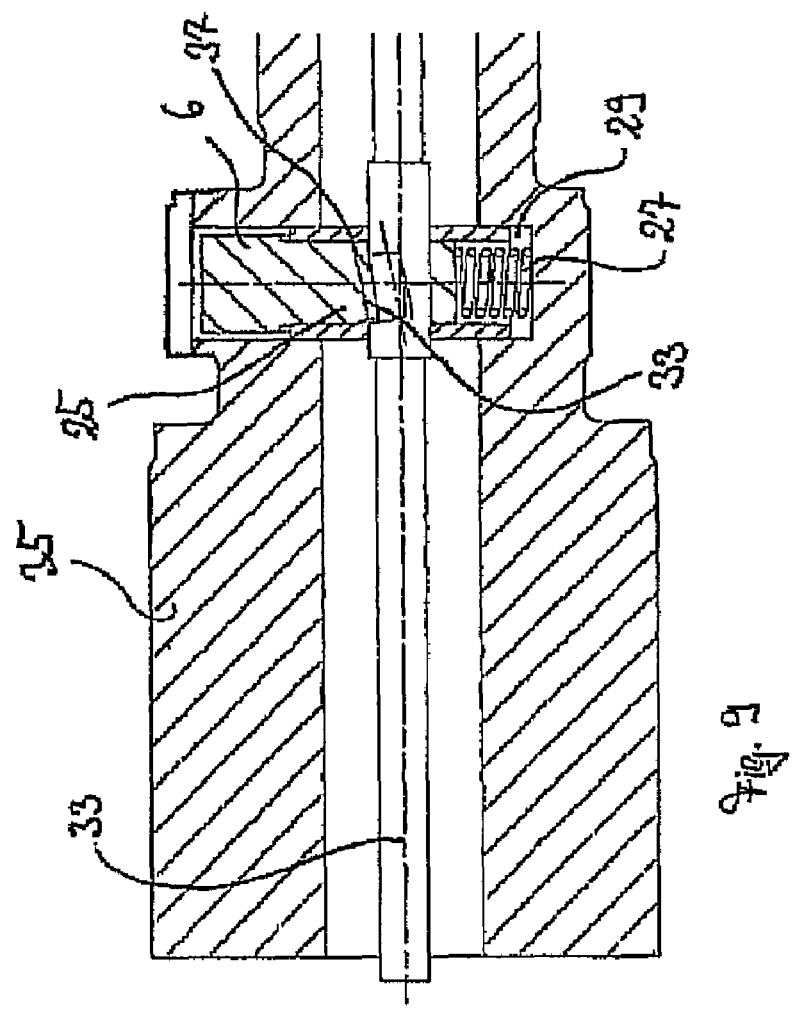
Figure 13:
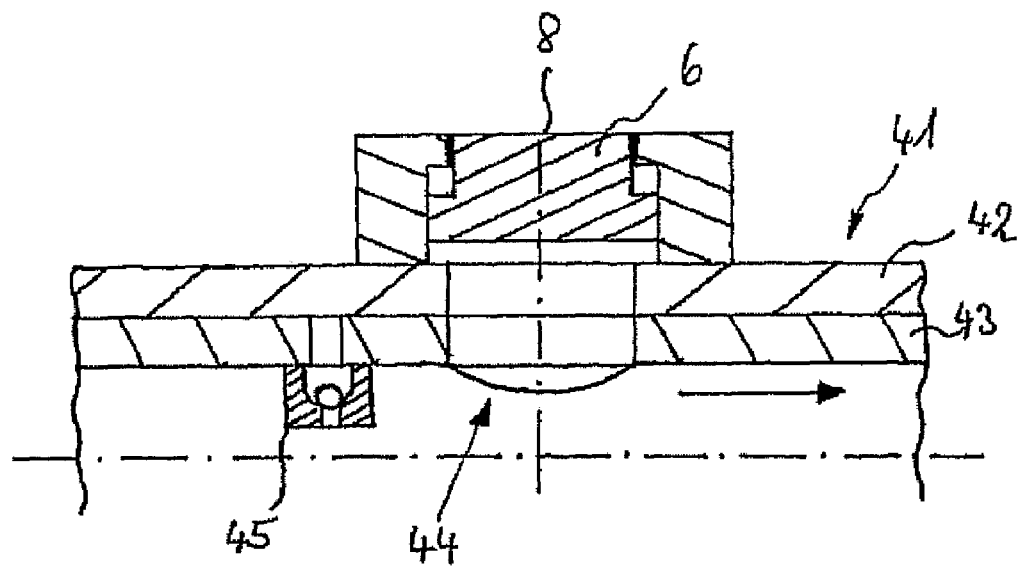
Figure 14:
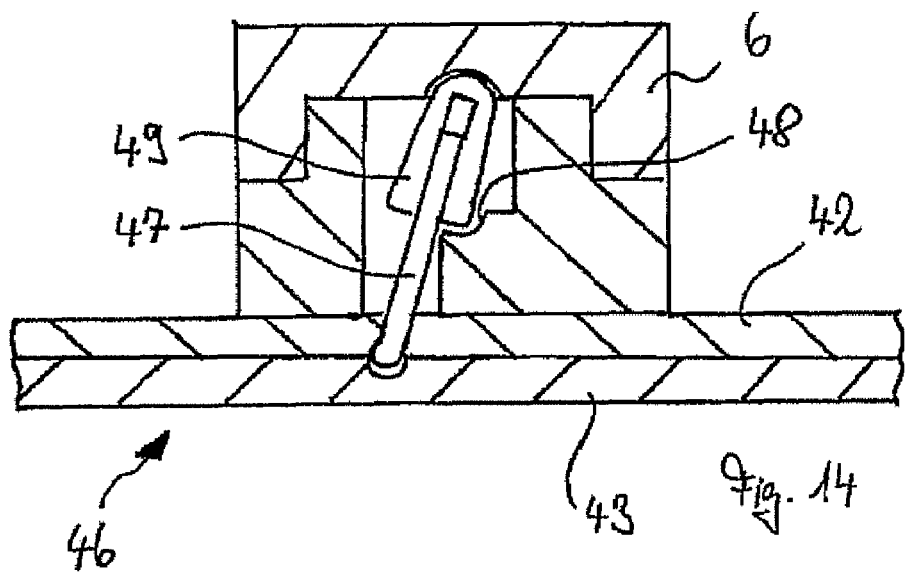
Figure 15:
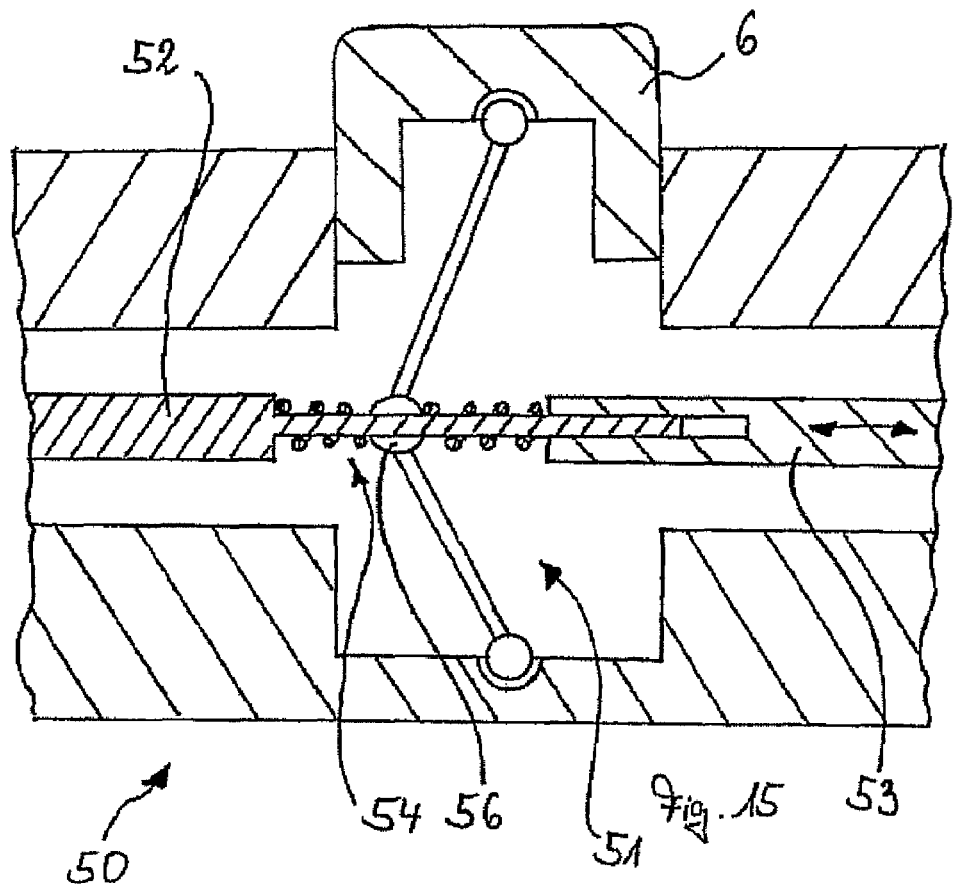
Figure 16:
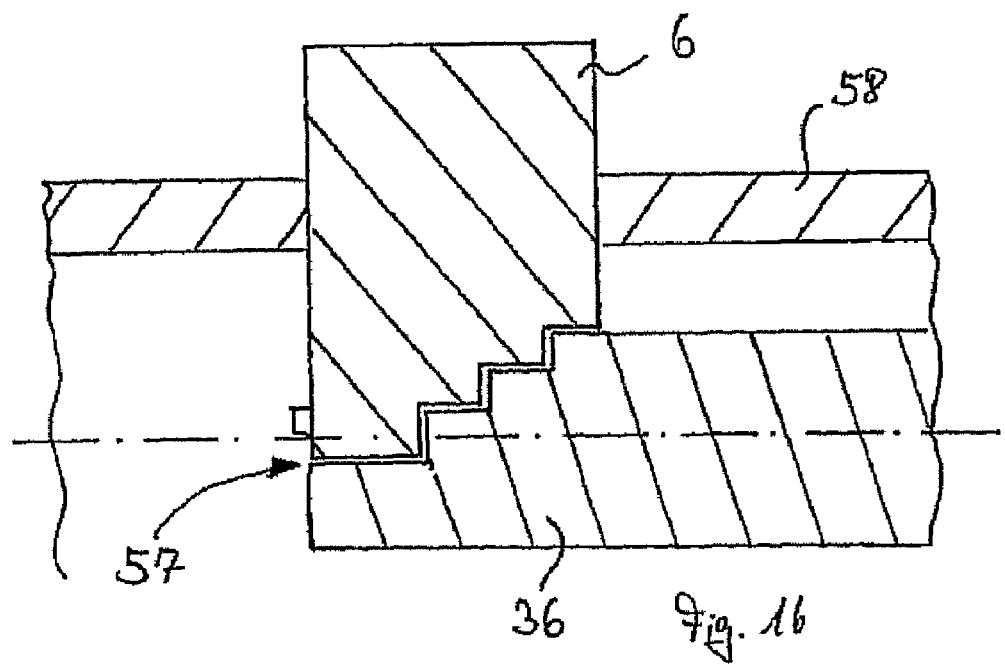
Figure 17:
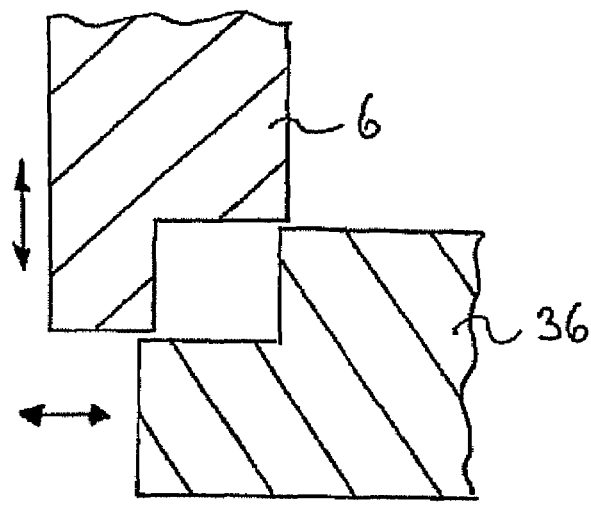
Figure 18:
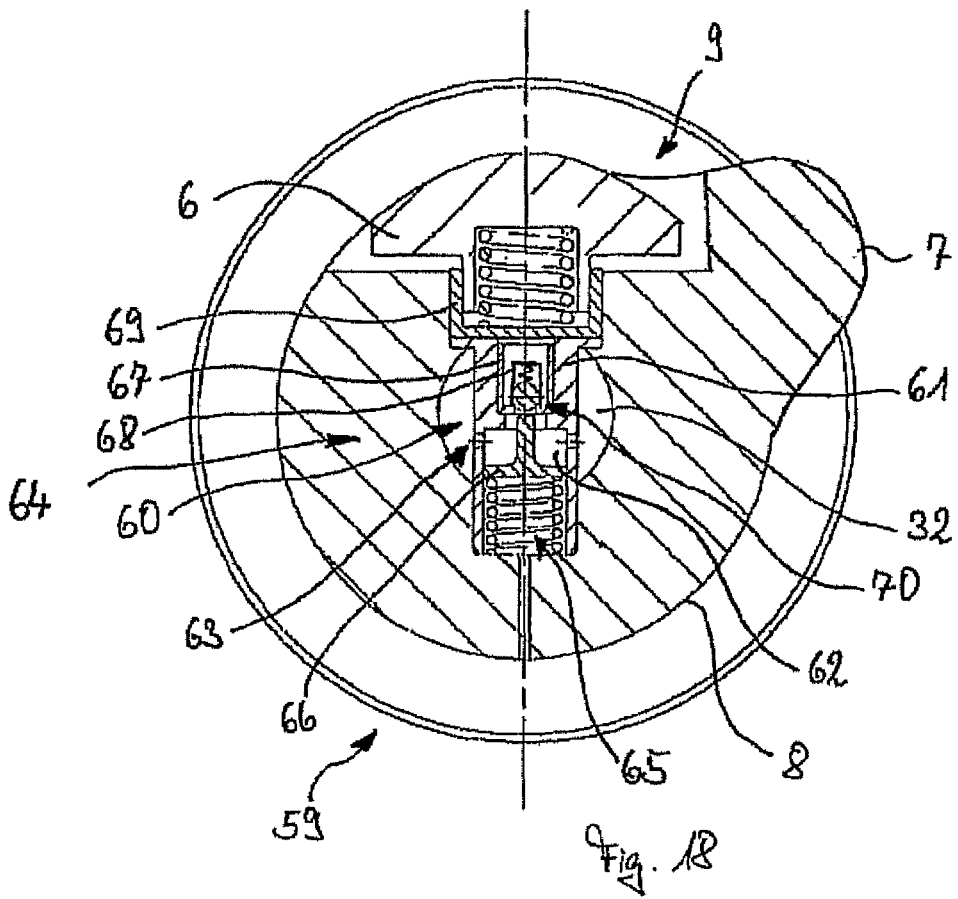

Also, the additional contoured body can be used on the inlet side or the outlet side or the inlet- and outlet-side. Other advantageous developments and refinements are explained in more detail in the following drawing. The developments and features described there, however, are not limited to the individual refinements. Rather, they can lead to other solutions with other features and developments, as they can be deduced, for example, from the description above or as they are described with regard to other developments of the figures. Shown are:

FIG. 1, a schematic view of a piston combustion engine;

FIG. 2, a diagram with regard to an exemplary cam course of a crankshaft;

FIG. 3, a first camshaft with a displaceable contoured body;

FIG. 4, a top view of the camshaft from FIG. 3;

FIG. 5, a second camshaft with a bulged guide;

FIG. 6, a top view of the second camshaft;

FIG. 7, a longitudinal section through a third camshaft;

FIG. 8, a cross-section through the third camshaft from FIG. 7;

FIG. 9, a longitudinal section through a fourth camshaft;

FIG. 10, a transverse section through the fourth camshaft from FIG. 9;

FIG. 11, a longitudinal section through a fifth camshaft;

FIG. 12, a transverse section through the fifth camshaft from FIG. 11;

FIG. 13, a longitudinal section through a sixth camshaft;

FIG. 14, a longitudinal section through a seventh camshaft;

FIG. 15, a longitudinal section through an eighth camshaft;

FIG. 16, a longitudinal section through a ninth camshaft;

FIG. 17, a schematic view of a mechanical adjusting possibility in a camshaft;

FIG. 18, a cross-section through a tenth camshaft;

FIG. 19, a longitudinal section through an eleventh camshaft;

FIG. 20, a longitudinal section through a twelfth camshaft; and

FIG. 21, a longitudinal section through a thirteenth camshaft.

FIG. 1 shows, in schematic view, a section from a motor vehicle with a piston combustion engine 1. The piston combustion engine 1 is alluded to by four cylinders 2, which on the one hand, are connected to a camshaft and corresponding gas inlet and gas outlet valves, which are not depicted in more detail and on the other hand, with a corresponding supply gas and exhaust gas conduit. In addition, an engine control device 4 is present which is connected to an adjusting device 5. The adjusting device 5 is able to adjust the contoured body 6 in the camshaft 3. The camshaft 3 has the contoured body 6, in addition to the cam 7. The cams 7 and also the contoured bodies 6 project beyond a base circle contour 8. The contoured bodies 6 are preferably located in a flank 9 of a cam contour, but may also be present separated therefrom. The cam contours 10 are converted into additional cam contours 11 if the contoured bodies 6 are in an active position.

By means of the camshaft 3, valve devices are operated, so that the gas inlet and the gas outlet valves are opened or closed, in accordance with the cam contour 10 or additional cam contour 11. By an adjustment of the contour body 6 and thus a change in the configuration of the camshaft 3, it is possible to influence a change of the opening or closing behavior by one or more valves, especially gas inlet and/or gas outlet valves, depending on the operating conditions. For example, for this purpose, a corresponding control is provided in the engine control device 4, which is carried out via the adjusting device 5. The engine control device 4 preferably has several entries for parameters that characterize the operation of at least the piston combustion engine 1. In addition, other parameters can be accepted and can lead to control signals to the adjusting device 5 in accordance with the appropriate evaluation. For example, a signal is sent on to the engine control device 4, via an actuation device 12, which can be activated for example by an operator 13. This signal can represent for example, a braking signal, a gas signal, or another parameter characterizing a wish from the operator 13. If for example, the operator 13 would like to accelerate the motor vehicle, the mother control device 4 accepts a corresponding adjusting signal via the actuation device 12. The adjusting signal is evaluated and if necessary, an appropriate adaptation to the configuration of the camshaft 3 is carried out via the adjusting device 5. If, for example, a negative acceleration should take place, as is the case with the execution of an engine braking, the gas outlet valves are, for example, controlled via a corresponding adjusting of the contoured bodies 6. On the other hand, the evaluation by the engine control device 4, for example, makes possible an internal exhaust gas recirculation undertaken by means of the adjusting device 5 by a corresponding actuation of the gas inlet and gas outlet valves.

An exhaust gas recirculation, as is shown in FIG. 1, can for example take place outside and inside the engine. In particular, the two can be combined with each other, as shown in FIG. 1. For the exhaust gas recirculation outside the engine, for example, air for the piston combustion engine 1 is suctioned and compressed via a compressor 14 of an exhaust gas turbo-supercharger 15. Turbine 16 of the exhaust gas turbo-supercharger 15 uses the exhaust gas that flows away from the piston combustion engine 1 in order to produce the needed compression energy for the compressor 14. The turbine 16 advantageously features an adjustment of the inlet configuration and/or the blades. Also, the compressor 14 can feature a corresponding configuration adjustment. This permits an adaptation of the supply air and exhaust gas flows or the energy yield from the same to the corresponding prevailing flow conditions in the different operation points of a piston combustion engine 1. For the exhaust gas recirculation outside the motor, a part of the exhaust gas can be conducted away before the turbine 16 and supplied to the air compressed by the compressor 14. Preferably, the exhaust gas conducted away is conducted through a heat exchanger 17 and correspondingly cooled down, is mixed with the air. The behavior of the exhaust gas turbo-supercharger 15 can, in particular, depend on the circulated exhaust air flow and is therefore preferably operated, adapted particularly with regard to the configuration adjustment, via the engine control device 4 in accordance with the flow conditions. Via flow guides, which are not shown in more detail, it is possible to adapt the circulation of a part of the exhaust gas flow to the individual operating conditions of the piston combustion engine 1, in particular by means of the engine control device 4. An internal exhaust gas recirculation is preferably initiated via the engine control device 4. This preferably takes place in correlation with the external exhaust gas recirculation. For the internal exhaust gas recirculation, a corresponding adjustment of the contoured bodies 6 is carried out by means of the adjusting device 5. For example, this makes possible a flowing in of a part of the exhaust gas flow through the gas outlet valve at a timepoint when gas is being supplied to the cylinder 2 via the gas inlet valve. Furthermore, an internal exhaust gas recirculation can be supported in that an additional heat exchanger 18 is provided. This is preferably located in the immediate vicinity of the gas outlet valve. The additional heat exchanger 18 makes possible a cooling of the exhaust gas flow flowing back to the cylinder 2, especially with an internal exhaust gas recirculation carried out over a broad operating range of the piston combustion engine 1.

FIG. 2 shows a schematic view of a diagram with regard to an exemplary valve elevation and thus a cam course of a camshaft. On the y axis, a height of a valve elevation has been plotted, from which the camshaft can be derived on an extension of a cam over the base circle contour. On the x axis, the camshaft rotation angle is indicated. In accordance with the shape depicted, the camshaft has, aside from the cam contour 10, the additional cam contour 11 in the flank 9 of the cam contour 10. Preferably, a highest elevation of the additional cam contour 11 is located at a cam end rotation angle between 50° and 95°, in particular between 70° and 90°, preferably between 75° and 80°. In particular, the additional cam contour 11 runs in such a way that the highest elevation of the additional cam contour 11 is in a ratio to the highest valve elevation of the cam contour 10 of approximately between 1:9 to 1:4, preferably between 1:8.5 and 6, in particular between 1:8 and 1:7.5. The highest valve elevation can be determined thereby via the maximum active position of the contoured body. The contoured body, however, can also have other active positions in which the additional cam contour 11 protrudes by a smaller percentage over the base circle contour. In addition to the placement of the additional cam contour 11 in the flank 9 of the cam contour 10, there is the possibility that in particular, for an internal exhaust gas recirculation, the additional cam contour 11 is located outside the flanks 9 of the cam contour 10.

FIG. 3 shows a first camshaft 19 with a contoured body 6, which is located so it can be displaced beyond the base circle contour 8. The contoured body 6 has an additional cam contour 11, whose elevation projects beyond the base circle contour 8. The contoured body 6 is located in a radially movable manner in the first camshaft 19. To this end, it can be moved radially along a guide present in the first camshaft 19, in and also out. Depending on how much the contoured body 6 stands out from the base circle contour 8, a corresponding influencing of a valve drive of the piston combustion engine will take place. In addition to the depicted contoured body 6, it is also possible to place one or more additional contoured bodies in the first camshaft 19.

FIG. 4 shows the first camshaft 19 from FIG. 3 in a top view. The contoured body 6 has such a configuration that it has a transition from its cam contour 10 to the base circle contour 8. The additional cam contour 11 makes possible, in particular, the availability of a transfer surface to a valve drive, which is sufficient even with a continual load, to avoid an excessively strong point-like loading of the contoured body 6.

FIG. 5 shows a second camshaft 20 in a longitudinal view. The second camshaft 20 has the contoured body 6 in a bent, especially rounded form. The contoured body 6 has, for example, a mushroom-like shape. The stem, which is not depicted in more detail here, is located, at least for the most part, sunk in the second camshaft 20. A corresponding head is located on the stem; it forms the additional cam contour 11. The stem and the additional cam contour 11 form the contoured body 6. The contoured body 6 can be shaped with one level as well as with several levels. For example, the stem can be produced separate from the head, wherein the two components are joined together subsequently. Preferably, the head of the contoured body 6 is shaped in such a way that a width 21 of the base circle contour 8 is surpassed. The head can, in this way, have a special protective function with respect to the stem located in the second camshaft 20. By the overlapping of the entire width 21, it is possible for the stem to push forward very close to the end areas of the width 21. The head of the contoured body 6 prevents a penetration of, for example, small particles into the second camshaft 20 and thus avoids operating disturbances.

FIG. 6 shows the second camshaft 20 from FIG. 5 in a top view. The contoured body 6 is shown with its head 22 in this top view, wherein the head 22 is preferably round. However, it can have another configuration, for example, an oval or also a mixture between round and straight configurations. A circular configuration, for example, has the advantage of it being easier to produce.

FIG. 7 shows a longitudinal section through a third camshaft 23. In the third camshaft 23, a contoured body 6 is located. The contoured body 6 can, for example, have a configuration, as can be deduced from FIG. 5 and FIG. 6. The contoured body 6 shown in FIG. 7 has a head part 24, which goes over into a foot area 25. A middle part 26 is located between the head part 24 and the foot area 25. Via the middle part 26, a guide in the third camshaft 23 in a radial direction is guaranteed. Via the foot area 26, a displacement of the contoured body 6 from the third camshaft 23 or into it is controlled. Preferably, the head part 24 is impinged on with a force which presses the head part 24 radially toward the outside. For example, this force, which preferably acts only radially, is applied by means of a spring 27. The spring 27 can, for example, be located, between the head part 24 and the third camshaft 23, wherein the spring 27 is supported on both. The third camshaft 23 preferably has a recess for this. The recess preferably holds not only the spring 27, but also, at least in part the head part 24. The recess and the head part 24 are, in particular, coordinated to one another for such an exact fit that a penetration of, in particular, particles is prevented. In particular, the fit can be selected in such a way that a penetration or exiting of liquid, in particular, oil from the third camshaft 23, is prevented. The head body 24 preferably has in interplay with the middle part 26 a T-shape in a cross-sectional view. The formation of corresponding cavities, in particular, cavities running around the circumference of the middle part 26, makes possible the placement of the spring 27 in them. The middle part 26 is also surrounded by a sleeve 28. The sleeve 28 makes possible a movement of the middle part 26 in it. On the other hand, the sleeve 28 centers the contour body 6 in such a way that an appearance of transverse forces and thus a tilting of the contoured body 6 is avoided. The sleeve 28 preferably meshes into a recess 29. In particular, the sleeve 28 can also be pushed, in a guided manner, in the recess 29. In this way, the contoured body 6 is, on the one hand, centered by means of the sleeve 28, which in turn receives its centering via a corresponding support in the third camshaft 23. A movement of the contoured body 6 in or out of the third camshaft 23 is, for example, carried out via an actuation agent 30. The actuation agent 30 can have mechanical, hydraulic, pneumatic, electromagnetic, electromechanical adjusting possibilities and/combinations [thereof] or other adjusting possibilities. The development shown in FIG. 7 has an adjusting rod 31. The adjusting rod 31 runs through a hollow area 32 of the third camshaft 23. The adjusting rod 31 preferably runs along a camshaft center 33. The adjusting rod 31 permits a mechanical connection to the contoured body 6. The contoured body 6 is changed in its position via an actuation of the adjusting rod 31. In particular, an adjustment of the adjusting rod 31 permits a movement of the contoured body 6 to an active position or to a position at rest.

FIG. 8 shows a cross-section through the third camshaft 23 and the contoured body 6 from FIG. 7. The contoured body 6 can moreover be shaped round as well as square, wherein the additional cam contour 11 is adapted to the base circular contour 8. The additional cam contour 11 is preferably designed in such a way that in a position at rest of the contoured body 6, it goes over flush into the base circle contour 8. In FIG. 8, the contoured body 6 shown there is in a position at rest. In this position at rest, it projects beyond the base circle contour 8. A passage 33 is located in the foot area 25 of the contoured body 6. The adjusting rod 31 runs through this passage 33. The adjusting rod 31 has a profile in this area, which makes possible a rotation of an adjusting surface 34, so that in this way the contoured body 6 can be transferred from a position at rest to an active position. Preferably, the adjusting force needed for this is applied by means of the radially acting force, in particular, the spring 27. The adjusting surface 34 acts, on the one hand, as a locking means in order to hold the contoured body 6 in its position at rest. On the other hand, the adjusting surface 34 is used as a locking means and force transmission surface for the contoured body 6 in its active position. If mechanical forces act on the additional cam contour 11, they are transferred to the foot area 25 via the head part 24 and the middle part 26. There, the forces that appear are transferred to the adjusting rod 31 by means of the adjusting surface 34. The adjusting rod 31 is sufficiently supported so as to be able to capture and compensate for the forces acting, in particular, radially and applied on the additional cam contour 11. The contoured body 6 can thus be firmly locked in its active position. In order to guarantee a sufficient centering between the contoured body 6 and the camshaft 23, in interplay with the sleeve 28, the adjusting rod 31 also runs through a corresponding opening in the sleeve 28. Preferably, the adjusting rod 31 is also supported in an exact fit in this opening. In this way, the corresponding, radially acting movement is transferred with a rotation of the adjusting rod 31, not only onto the contoured body 6, but rather also onto the sleeve 28. In accordance with another development, the sleeve 28 remains in its position with a rotation of the adjusting rod 31. As can be further deduced from FIG. 8, there is a cam contour 10 in addition to the additional cam contour 11. The cam contour 10 is present, separate from the additional cam contour 11. This displacement between the additional cam contour 11 and the cam contour 10 is, for example, interpreted, according to [some] viewpoints, as the most frequent operating points of the piston combustion engine—as the application purpose of the additional cam contour 11 in interplay with the valve drive and other parameters. This can be different from one piston combustion engine to another.

FIG. 9 shows a longitudinal section through a fourth camshaft 35. A contoured body 6 is again situated in the fourth camshaft 35. For example, the contoured body 6 can be shaped and situated at least similar to that from FIG. 3 or FIG. 4. An adjusting rod 31 on which a coupling bolt 36 is located, runs, once more, in the fourth camshaft 35. The coupling bolt 36 has a slope 37, which finds a corresponding counterpart in the configuration of the passage 33 of the foot area 25 of the contoured body 6. The adjusting rod 31 is, for example, moved along the camshaft middle 33. Through the action of the slope 37, an active position or position at rest of the contoured body 6 can be adjusted, on the one hand. The slope 37 permits a continuous adjustment of the contoured body 6 in the radial direction, on the other hand. Furthermore, a force acting radially on the contoured body 6 is applied on the foot area 25 of the contoured body 6. For example, for this purpose, the spring 27 is situated in the recess 29.

FIG. 10 shows a transverse section through the fourth camshaft 35. The cam 7 has an incision 38, in which the contoured body 6 with its head part 24 is located. The cam contour 10 goes over into the additional cam contour 11, wherein the additional cam contour 11 is located in the flank 9 of the cam contour.

FIG. 11 shows a longitudinal section through a fifth camshaft 39. In the fifth camshaft 39, the contoured body 6 is, once again, located in a movable manner. An adjustment of the contoured body 6 takes place by means of the coupling bolt 36. This permits a radial movement of the contoured body 6 as a result of the radial force, which acts on the foot area 25 of the contoured body 6, preferably by means of the spring 27. The adjusting rod 31 is rotated with the coupling bolt 36 located on it. This rotation makes possible a radial adjustment of the contoured body 6, as clearly subsequently results from FIG. 12.

FIG. 12 shows a cross-section through the fifth camshaft 39 from FIG. 11. The coupling bolt 36 runs through in the foot area 25 and in this way, permits a mechanical coupling. If the coupling bolt 36 is rotated, the spring 27 presses against the foot area 25. By an eccentric support of the coupling bolt 36, with reference to the camshaft middle 33, the contoured body 6 is adjusted, in a lockable manner, between a position at rest and an active position. The coupling bolt 36 makes it possible, in particular, for a mechanical force transmission to be effected onto the coupling bolt 36 via the additional cam contour 11. In this way, a mechanically acting radial force can be compensated. The position of the contoured body 6 shown in FIG. 12 is the position at rest, wherein a movement is orientated radially onto the additional cam contour 11 of the contoured body with a radially acting force, if the radial force is larger than the acting force of the spring 27. In this way, for example, the position at rest can permanently permit a lifting of the additional cam contour 11 over the base circle contour 8. On the other hand, an overload securing can be provided in this manner, which avoids, in particular, damage to a valve adjusting path transmission device. Preferably, the head part 24 is provided with limiting interfaces 40 with a radial movement of the contoured body 6. The interfaces 40 can, for example, lie on the camshaft 39 if the force of the spring 27 is overcome. In this way, the contoured body 6 is brought to a position, in which a force transmission from the contoured body 6 onto the fifth camshaft 39 is ensured and thus an overloading, for example, of the adjusting rod 31 or of the coupling bolt is ruled out.

FIG. 13 shows a longitudinal section through a sixth camshaft 41. The sixth camshaft 41 has, for example, an outside tube 42, in which an inside tube 43 is located, in a supported manner. The base circle contour 8 is placed on the outside tube 42. The contoured body 6 is situated in such a way that it is embedded into the base circle contour 8 and is flush with it. A fluid, which can be placed under pressure, is in the inside tube 43. The inside tube 43 and the outside tube 42 have an access 44 via which the fluid can arrive at the contoured body 6. If the fluid is under pressure, a corresponding pressure builds up below the contoured body 6. This hydraulic cushion, which is underneath, can, for example, be uncoupled from the rest of the fluid by a rotation and/or displacement of the inside tube 43 relative to the outside tube 42. The radial pressure, which then acts on the contoured body, is maintained, independent of the state of the fluid in the inside tube 43. The blocked access 44 can again be released by a corresponding counter-movement, so that in this way the fluid can flow away from the contoured body 6. Furthermore, there is the possibility for a valve 45, particularly, a check valve, to be situated on the inside tube. The valve 45 makes possible, for example, for the access 44 to be closed and nevertheless, for a fluid to arrive at the contoured body 6. This is possible, in particular, if the fluid located in the inside tube 43 is under a greater pressure than the fluid present directly on the contoured body 6. Furthermore, the valve 45 makes possible a compensation of, for example, fluid leakage losses, which have occurred along the contoured body 6.

FIG. 14 shows a longitudinal section through a seventh camshaft 46. The seventh camshaft 46, in turn, has an inside tube 43 and an outside tube 42. The contoured body 6 is mechanically changed in its position in that an articulated connection is produced between the contoured body 6 and the inside tube 43. An articulated lever 47 is situated so that it can swivel, wherein by means of a swiveling movement, the contoured body 6 can be moved in and, once again, out. To this end, for example, the inside tube 43 is axially displaced, wherein a part of the articulated lever 47 slides along a guide 48. In this way, a pressure force acts on the contoured body 6, which is transferred by a sling element 49. The sliding element 49 is conducted via the articulated lever 47. By sliding the sliding element 49 along the guide 48, with a simultaneous position change of the articulated lever 47, a pressure force is exerted on the contoured body 6. Thus, this point is displaced. A return movement of the contoured body 6 takes place, for example, as a result of an outside adjacent restoring force, which after the sliding back of the inside tube 43 and thus a swiveling back of the articulated lever 47 and the sliding element 49 along the guide 48, makes possible a postponement of the locking and thus a return movement of the contoured body. Furthermore, there is the possibility of a sixth articulation coupling of the articulated lever 47 or the sliding element 49 with the contoured body. The development of an adjusting possibility of the contoured body 6, which can be seen in FIG. 14, reflects the principle of the mechanical coupling of contoured bodies 6 and a corresponding adjusting means. FIG. 15 shows another possibility of carrying out a mechanical coupling for the adjusting of the contoured body.

FIG. 15 shows a longitudinal section through an eighth camshaft 50. From this figure, one can see the principle of a toggle lever as an adjusting means for the contoured body 6. To this end, for example, the eighth camshaft 50 can have a siding rod system 51. A sliding rod 52 is guided, in a movable manner and axially, along the eighth camshaft 50 in an axial guide 53. The sliding rod system 51 is preferably under an internal stress. This internal stress is, in particular, produced by a spring system 54. To this end, for example, one or more springs, preferably spiral springs 55, are located between the sliding rod 52 and the axial guide 53. The spiral springs 55 can produce axial forces which bring about a movement of the contoured body 6 in a radial direction with respect to the eighth camshaft 50 when the siding rod 52 is adjusted. To this end, a linking block 56, which, on the one hand, has an articulated connection to the contoured body 6 and, on the other hand, an articulated connection to the eighth camshaft 50, is located on the sliding rod 52. Preferably, this articulated connection is carried out in its interplay in such a way that a toggle lever system is produced. This toggle lever system has the advantage that an automatic locking of the sliding rod system 51 takes place in am active position of the contoured body 6. This automatic locking can be eliminated, once more, only if the sliding rod 52 moves back, so that the restoring force of the spiral springs 55 overcomes the locking force of the sliding rod system 51.

FIG. 16 shows another mechanical adjusting system for the contoured body 6. To this end, for example, a step-like configuration 57 is provided, which creates a coupling of the contoured body 6 with, for example, the coupling bolt 36. The step-like configuration 57 permits, on the one hand, a step by step adjustment of the contoured body 6 in the radial direction. On the other hand, the step-like configuration 57 permits a support of the contoured body 6, which acts over a broad area, to hold and transmit radially acting forces. This avoids, in particular, a point load, which can result in material damage. Furthermore, the step-like configuration 57 has the advantage that a radial movement of the contoured body 6 takes place by means of a transmission. If, for example, an adjusting movement is carried out in the axial direction of the ninth camshaft 58, then this axial movement is transferred into a radial movement of the contoured body 6 by means of a transmission ratio. For example, a transmission ratio of axial path to radial path can lie in a range between 1:1 and 1:5, in particular between 1:2 and 1:4, and preferably between 1:2 and 1:3. In this way, it is possible, for example, to minimize a switching time for the contoured bodies 6. Preferably, the contoured body 6 in its active position can be switched from the position at rest within 0.75 milliseconds and less. By a coupling of the path, it is possible to shorten a fixed switching time proportional to it by means of the transmission ratio. In addition to a development of the step-like configuration 57, any other development can also be used for this, which makes possible a transmission ratio and thus a reduction of the switching time. This can take place, for example, by means of a spiral-shaped, worm-shaped, or other gear-like transmission. Furthermore, this type of mechanical coupling of the contoured body 6 has the advantage that radial forces acting on it can be reliably captured and conducted away. In addition, an exact guiding of the contoured body 6 is guaranteed.

A refinement of the development that can be seen in FIG. 16 provides for a fluid to be located in the interior of the ninth camshaft 58. The fluid can be set under pressure. As a result of the shape of the step-like configuration 57, the possibility exists that a pressure-effect gap will be present between the coupling bolt 36 and the contoured body 6. If the pressure of the fluid is increased, a higher radial forces acts on the contoured body 6 in this way. Thus, the contoured body 6 can glide radially to the outside. By a corresponding adjusting movement of the coupling bolt 36, the contoured body 6 is subsequently secured and supported via the step-like configuration 57. A pressure applied from the outside on the contoured body 6 is thus not absorbed by the fluid, but rather by the coupling bolt 36.

FIG. 17 shows another development, which takes place in imitation of that from FIG. 16. FIG. 17 shows, with the aid of a one-step configuration, the displacement possibility of the contoured body 6 as a function of the movement direction of the coupling bolt 36. The movement of the contoured body 6 can, for example, be effected via an acting fluid pressure force and also by another force creation. This can be, for example, the force of a spring or the like.

FIG. 18 shows a cross-section through a tenth camshaft 59. The tenth camshaft 59 has a cam 7 and a contoured body 6, which is located at least partially in the flank 9 of the cam 7. The tenth camshaft 59 has a hollow area 32, which is located along the middle of the camshaft 33. A fluid is found in the hollow area 32; it has an adjustably changing pressure. This fluid pressure is pressed on a pressure transmission device 60. The pressure transmission device 60 makes possible a radially in and out movement of the contoured body support and thus of the contoured body 6, as a function of at least the pressure fluid. In the development of the pressure transmission device 60 shown in FIG. 18, a hollow cylinder 61 is provided whose interior 62 is impinged on with the fluid pressure via fluid passages 63. An adjusting system 64 is located in the interior 62 of the hollow cylinder 61. The adjusting system 64 has a chamber under pressure 65. In this chamber 65, for example, a medium under pressure and/or a spring is located, which counteracts a pressure force acting in the interior 62 by the fluid, on a punch 66 limiting the chamber 65. As a result of the individual pressure difference, the punch 66 is moved radially in one or the other direction. A bushing 67 situated firmly in the hollow cylinder 61 and with a bushing cavity 68 is correlated with the punch 66. A movement of the punch 66 leads to a movement in or out of the bushing 67. If a low pressure prevails in the hollow area 32, the punch 66 will provide a lifting of the sphere. With a pressure increase in the hollow area 32, the sphere is released; the bushing cavity 68 is filled, but is not emptied due to the blocking of the opening in the bushing 67 by means of the sphere. The sphere is thus a possible development of a check valve for pressure control. To this end, the sphere can, for example, be moved only along a guide. Also, the sphere itself can be impinged on by the pressure, for example, by means of a spring. Due to the contact of a bottom plate 69, on which the contoured body 6 is supported, a pressure force prevails in the bushing cavity 68. Thus, a pressure force is applied between the bottom plate 69 and the contoured body 6. If a high pressure, for example, prevails in the bushing cavity 68, then the contoured body is kept in one position. After a rolling over of the contoured body 6, a leakage can be compensated with the check valve.

The pressure force is also produced, for example, by means of a spring via which the one radially acting force of the bottom plate 69 acts on the contoured body 6. If a pressure force prevails in the interior 62 of the hollow cylinder 61, then this is transferred, on the one hand, onto the punch 66. On the other hand, the bushing 67 is also impinged on by this pressure. The bushing 67 has a pressure valve 70 via which the bushing cavity 68 can be separated from the interior 62. The pressure transmitted from the interior 62 into the bushing cavity 68 acts on the bottom plate 69 and experiences, on the other hand, the force acting between the bottom plate 69 and the contoured body 6. With a pressure difference prevailing on the bottom plate 69, a corresponding radial movement is carried out, which then leads to the adjusting of the contoured body 6. If the fluid pressure is high enough in the interior 62, the counteracting radial forces are compensated in this way, and an adjusting force acts, wherein the contoured body 6 is displayed beyond the base circle contour 8. By a lowering of the fluid pressure in the interior 62, the force ratio changes so that the bottom plate 69 is once again lowered. The contoured body 6, however, is kept in a definable position by the spring located between the bottom plate 69 and the contoured body 6. By means of such a pressure transmission device 60, it is possible for a power transmission to be supported hydraulically in an active position of the contoured body 6. In a position at rest of the contoured body 6, on the other hand, the oil pressure is lowered to such an extent that the contoured body 6 is cushioned only through a permanently acting force. In this development for example, it is possible for the contoured body to assume the same position in the active position as in the position at rest.

FIG. 19 shows a longitudinal section through an eleventh camshaft 71. The eleventh camshaft 71 has three contoured bodies 6 located next to one another, which are connected to one another via a mechanical adjusting system. The adjusting system can, for example, have an adjusting rod 31, which connects the coupling bolts 36 of the contoured body 6 to one another. By this mechanical connection of the coupling bolts 36, a corresponding movement is transferred to the other contoured bodies 6 with an actuation of an individual contoured body 6. For example, a mechanical mutual coupling of the coupling bolts 36 takes place via a spring system, wherein, for example, torsion springs or axially acting springs are located between the coupling bolts 36. If the first coupling bolt 36 is actuated, its movement is transferred via the spring system to the next adjacent coupling bolt 36. In this way, upon initiation, a radial movement for a contoured body 6 will trigger one after the other, corresponding movements of the other contoured bodies 6. In particular, this permits, in accordance with the development shown in FIG. 19, axial displacement of the coupling bolts 36 and in this way, securing of the contoured body 6 mechanically in a force-free state. If a force is subsequently exerted on the contoured body 6, this is passed on via the then coupled-on coupling bolt 36.

FIG. 20 and FIG. 21 show another development of a coupling of the contoured body 6, which is located in a twelfth camshaft 72. Whereas a section of a coupling element 73 can be seen in FIG. 20, the position of the coupling element 73, illustrated with reference to the contoured body 6, is shown in FIG. 21. The coupling element 73 has an axis 74, which is located at an angle to a camshaft axis 75. By the angular arrangement of the axis 74, on the one hand, a simpler processing of the twelfth camshaft 72 is possible. The introduction of a corresponding pocket borehole can be undertaken with great precision. Furthermore, the angular arrangement permits force transmission by means of a radially acting and an axially acting force fraction, with a coupling of the coupling element 73 with the contoured body 6. This improves the reliability of the force transmission and avoids, in particular, a point or line load of the force-transmitting elements.

The invention under consideration is suitable, in particular, for use with diesel engines, which are operated in stationary or nonstationary operation. Preferably, the invention is used for an internal exhaust gas recirculation. This is preferably combined with the possibility of an engine brake.

The invention claimed is:

1. A piston combustion engine comprising: gas intake valves and gas exhaust valves;
    said gas intake valves and gas exhaust valves positioned over at least a cam shaft;
    a cam on said at least one cam shaft has a base circular outline and the base circular outline has a radially extending cam portion;
    for at least one of a plurality of valves, preferably gas exhaust valves engaging the cam, a contour body with at least an additional radially extending cam portion is provided and the contoured body is positioned in the base circular outline of the cam from a superior active position, wherein the additional contoured body is in the form of a mushroom, comprising: a part of one of the plurality of valves;
    an elongated hub cam and a guide body, which are preferably cylindrical, wherein the elongated hub cam extends on at least one side in a groove transverse to the cam shaft axle in the base circle outline and/or cam profile of the cam shaft in the form of an anti-twist plate with the guide body lying radially inside a guide, preferably in a guide bore, extends in the cam shaft and the additional contoured body is radially adjustable.

2. The piston combustion engine of claim 1 wherein the contoured body is brought into an active position with a servo motor.

3. The piston combustion engine of claim 1 wherein that the diameter of the cylindrical guide body is more greater than the width of the elongated hub cam.

4. The piston combustion engine of claim 1 wherein the additional contour body is eccentrically arranged in a long axis of the cam shaft.

5. The piston combustion engine of claim 1 wherein the additional contoured body is eccentrically arranged with respect to the cam.

6. The piston combustion engine of claim 1 wherein the respective cam and/or the additional contoured body are eccentrically arranged with respect to a cam follower.

7. The piston combustion engine of claim 6 wherein a spherically extending cam follower of the respective cams and/or the additional contoured body has a shape selected from the group consisting of: angular, conical, spherically, and spatially matched, for the avoidance of edge wear.

8. The piston combustion engine of claim 1 wherein elongated hub cam and/or the cylindrical guide body are eccentrically arranged to long axis of the cam shaft.

9. The piston combustion engine of claim 1 wherein the movement of the additional guide body is limited by a mechanical signal in the servo unit.

10. The piston combustion engine of claim 1 wherein a force exists between the additional contour body and the cam shaft, preferably the force is a resilient force, such that in a deactivated condition the additional contour body is in contact with a stop in a fully extended position, for example in contact with the cam follower stop.

11. The piston combustion engine of claim 1 wherein a contoured body is brought into an active position with an auxiliary cam structure in a cam shaft with a servo unit applying an adjustable force.

12. The piston combustion engine of claim 11 wherein the servo motor uses a hydraulic apparatus to generate the force.

13. The piston combustion engine of claim 12 wherein the servo motor further comprises a spring.

14. The piston combustion engine of claim 11 wherein the auxiliary cam outline extends in the active position above a flank of the radially extending cam portion.

15. The piston combustion engine of claim 11 wherein the auxiliary cam outline in a resting position extends above a flank of the radially extending cam portion.

16. The piston combustion engine of claim 1 further comprising a contour guide or a ventilation guide device eccentrically positioned relative to a cam shaft center.

17. The piston combustion engine of claim 1 further comprising a servo unit connection for bringing a contoured body into an active position with a mechanical coupling element for the radial activation and straight line displacement positioning of the contoured body.

18. The piston combustion engine of claim 17 wherein the contoured body in a resting position takes the active position.

19. The piston combustion engine of claim 17 wherein the coupling element is a coupling pin.

20. The piston combustion engine of claim 17 wherein that the cam shaft has a plurality of auxiliary cam structures and a plurality of mechanical couplings that are all advanced upon the activation the contoured body.

21. The piston combustion engine of claim 1 wherein operation of the contoured body regulates the operation of an internal exhaust gas guide.

22. The piston combustion engine of claim 1 wherein during an engine braking of the contoured body operation of an exhaust valve is activated.

* * * * *

UNITED STATES PATENT AND TRADEMARK OFFICE
CERTIFICATE OF CORRECTION

PATENT NO. : 7,533,640 B2  
APPLICATION NO. : 10/568214  
DATED : May 19, 2009  
INVENTOR(S) : Joachim Hahn et al.

Page 1 of 1

It is certified that error appears in the above-identified patent and that said Letters Patent is hereby corrected as shown below:

In the Specification:

In Column 8, Line 45, change "can" to --cam--

In the Claims:

In Claim #20, Column 20, line 11, After "activation" insert --of--

In the Assignees (73) change "Fev Motorentechnik GmbH" to --FEV Motorentechnik GmbH--

Signed and Sealed this

Sixth Day of October, 2009

David J. Kappos
*Director of the United States Patent and Trademark Office*